US011269471B2

(12) United States Patent
Lin et al.

(10) Patent No.: US 11,269,471 B2
(45) Date of Patent: Mar. 8, 2022

(54) SENSOR DEVICE AND METHOD

(71) Applicant: Tangi0 Limited, London (GB)

(72) Inventors: Chia-hung Lin, London (GB); Ilan Johan Eduardo Olivarez Correa, London (GB); Liucheng Guo, London (GB); Ming Kong, London (GB)

(73) Assignee: Tangi0 Limited, London (GB)

( * ) Notice: Subject to any disclaimer, the term of this patent is extended or adjusted under 35 U.S.C. 154(b) by 0 days.

(21) Appl. No.: 16/410,283

(22) Filed: May 13, 2019

(65) Prior Publication Data

US 2019/0346974 A1 Nov. 14, 2019

(30) Foreign Application Priority Data

May 11, 2018 (GB) ...................................... 1807711

(51) Int. Cl.
*G06F 3/044* (2006.01)

(52) U.S. Cl.
CPC .......... *G06F 3/0448* (2019.05); *G06F 3/0447* (2019.05); *G06F 2203/04102* (2013.01); *G06F 2203/04103* (2013.01)

(58) Field of Classification Search
CPC .............................. G06F 3/0448; G06F 3/0447
USPC .................................................. 345/173, 174
See application file for complete search history.

(56) References Cited

U.S. PATENT DOCUMENTS

| 6,369,588 | B1 * | 4/2002 | Sleefe .................... G01B 7/287 324/663 |
| 6,373,265 | B1 | 4/2002 | Morimoto et al. |
| 8,994,648 | B2 | 3/2015 | Lamb |
| 9,354,720 | B1 * | 5/2016 | Hsieh ..................... G06F 3/0383 |
| 9,898,095 | B2 * | 2/2018 | Hsieh ..................... G06F 3/0338 |
| 10,268,328 | B2 * | 4/2019 | Otagaki ................ H03K 17/975 |
| 2003/0222660 | A1 | 12/2003 | Morimoto et al. |
| 2013/0162596 | A1 | 6/2013 | Kono et al. |
| 2014/0225855 | A1 | 8/2014 | Aitchison et al. |
| 2015/0227217 | A1 | 8/2015 | Fukumoto |
| 2016/0275333 | A1 | 9/2016 | Lin |

(Continued)

FOREIGN PATENT DOCUMENTS

| JP | 2013-232291 | 11/2013 |
| TW | 201506749 | 2/2015 |
| WO | 2016/206819 | 12/2016 |

OTHER PUBLICATIONS

GB Search Report, GB Patent Application No. 1807711.5, dated Nov. 23, 2018.

(Continued)

*Primary Examiner* — Calvin C Ma
(74) *Attorney, Agent, or Firm* — Andrus Intellectual Property Law, LLP

(57) ABSTRACT

A sensor device has a plurality of electrode portions configured to provide one or more electrical signals and a non-conductive material provided on or over the plurality of electrode portions. The one or more electrical signals are provided in response to a change in capacitance between (i) at least one of the plurality of electrode portions and a conductive object being near to or in contact with the non-conductive material, and/or (ii) at least one of the plurality of electrode portions and at least one other of the plurality of electrode portions. A system comprising the sensor device and method of manufacturing the sensor device are also provided.

29 Claims, 21 Drawing Sheets

(56) References Cited

U.S. PATENT DOCUMENTS

2017/0177104 A1* 6/2017 Reynolds ............. H05K 1/0274
2017/0371490 A1   12/2017 Sugimoto et al.
2019/0064965 A1*  2/2019 Yoon .................... G06F 3/0445
2019/0196621 A1*  6/2019 Joo ...................... H01R 12/722
2019/0227667 A1*  7/2019 Harrison ................ G06F 3/044

OTHER PUBLICATIONS

Extended European Search Report, EP Patent Application No. 19174249.3, dated Oct. 10, 2019.

* cited by examiner

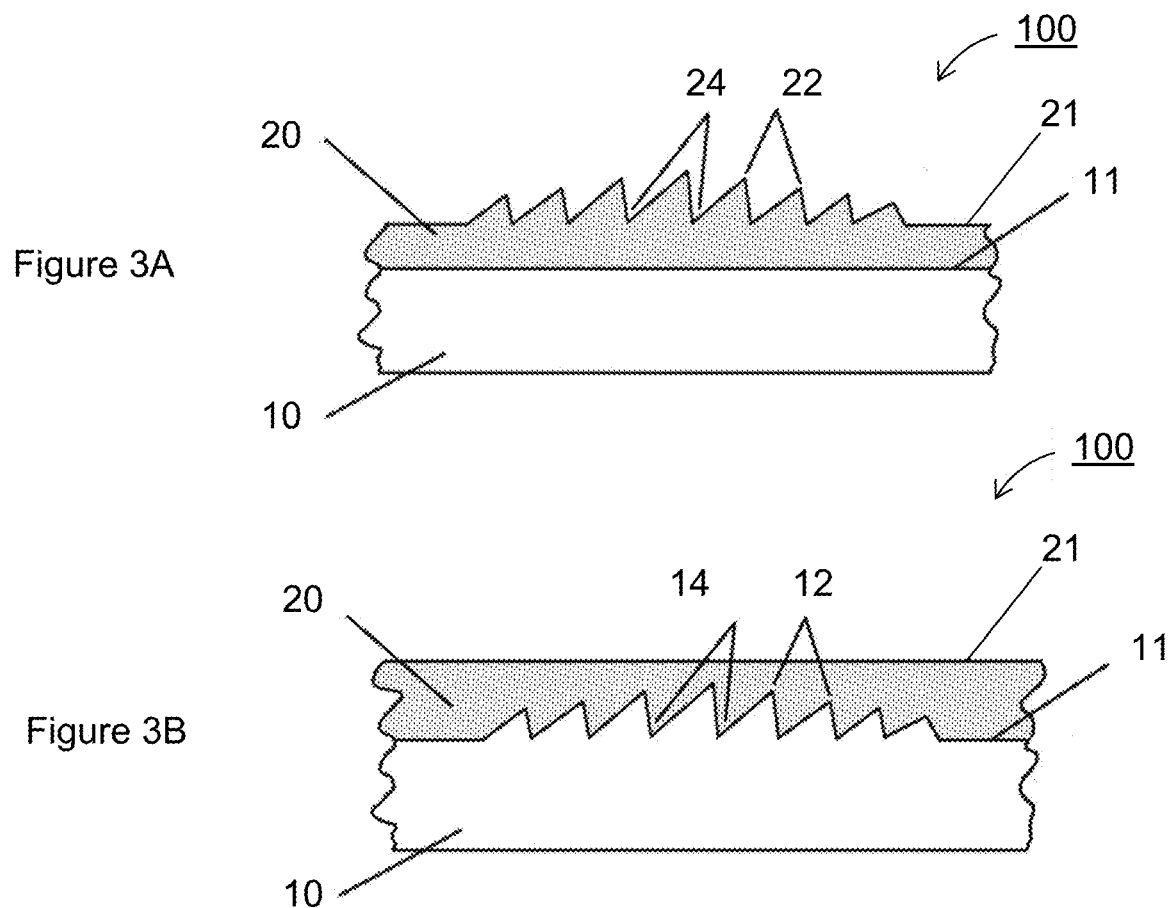
Figure 3A
Figure 3B
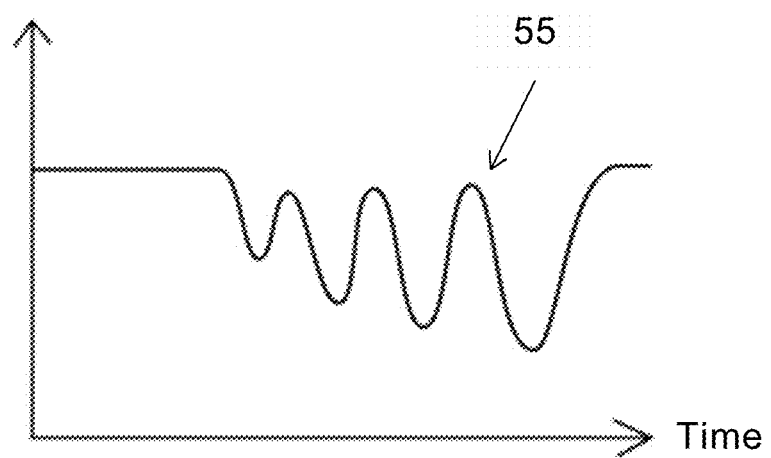
Figure 3C

SENSOR DEVICE AND METHOD

CROSS-REFERENCE TO RELATED APPLICATIONS

This application claims the benefit of and priority from British Patent Application No. 1807711.5, filed May 11, 2018 in the British Patent Office. The British application is incorporated herein by reference, in entirety.

TECHNICAL FIELD

This invention relates generally to a sensor device and, particularly but not exclusively, to a sensor that can perform both touch location sensing and pressure/force sensing. The invention also relates to a method of manufacturing the device, a method of sensing an electrical signal using the sensor device and systems comprising the device.

BACKGROUND TO THE INVENTION

Tactile sensors provide a way of obtaining information via a physical interaction with the sensor, and are commonly used in applications such as mobile and computing devices, robotics, and control systems. These may operate based on piezoresistive, piezoelectric, capacitive and elastoresistive sensing. For example, in a capacitive touch switch, a person needs merely to touch the sensor, which changes the capacitance within the sensor and triggers the switch. A variety of pressure sensitive materials are now available, including quantum tunneling composites, for use in pressure switching and sensing. These are utilized in soft robotics, heavy machinery and wearables. Examples including conductive inks have been developed to integrate sensitivity into the material itself and create "soft electronics". Three-dimensional (3D) (virtual reality) interfaces are also known.

The applicant's earlier application, PCT/EP2016/025067, discloses a touch sensor device comprising or consisting of a planar sheet of electrically conductive material having a 3D textured surface configured to create a change in electrical signal in response to movement of a conductive object (e.g. a person's finger) across the material surface and/or deformation of the material itself. Other areas of the material can be of a 3D form, and can be used for pressure sensing. The sensed electrical signals from such devices can be used in control applications.

Many different electronic devices require electronic control by a touch interface. Some have an integrated control, e.g. in an electric razor. Others are remotely connected e.g. a wireless touch controller. A number of different control methods and systems for touch sensing are known, including keyboards, capacitive trackpads, display trackpads, joysticks etc. Most of these interfaces comprise one or more outer injection moulded rigid plastic parts, e.g. housings, buttons, keys etc., that act on an underlying biased member such as a spring or soft foam actuation layer which, in turn, acts on a printed circuit board (PCB) underneath to produce, on touch actuation and completion of an electronic circuit, a readable voltage signal.

Such controllers are convenient due to their relatively simple construction and operability, and are widely used. However, they suffer a number of drawbacks. In particular, existing touch sensing technologies rely heavily on the use of a large quantity of traces, electrodes and sensors. In addition, the materials used and manufacturing methods can greatly limit the touch interface product's format to being predominantly flat and rigid, which limits its use in certain applications. For example, they typically employ moulded hard encapsulation materials, which are not deformable and therefore do not provide soft pressure tactile feedback to the user. Furthermore, where any buttons, joysticks, keys etc. are provided on/in the controller housing, the gaps between the control features and the housing are prone to entry by water, dust and other contaminants. Certain applications in particular, for example automotive interiors, require good longevity and reliability, and any gaps could permit such contaminants to enter and lead to failure of the electronic circuits housed inside.

Where steps have been taken to address this problem, this has inevitably led to increased costs and complexities. This is often undesirable, particularly in mass produced, low value electronic items and in a commercial marketplace that is already busy and competitive. For example, in U.S. Pat. No. 8,994,648, a soft resilient substrate layer is overlaid on top of a force sensor array which, when configured, can produce electrical signals describing the touch pressure and location, but the quantity of embedded sensors and wiring, and the need for their calibration, means that production costs are high. Such an arrangement may also be limited to certain 3D profiles applied to a firm planar base in order for the force sensors to reliably operate. For example, it may be difficult to implement overhanging 3D structures, handheld 3D devices or surfaces that have a drastic curvature.

Functionally speaking, most touch interface products only allow either modular pressure sensing or XY touch location sensing and employ load cell electronic sensors. In cases like software control/navigation, virtual reality (VR) control and automotive interior control, the detection and use of 3D touch interactions (i.e. X, Y and Z sensing) and other gestural interactions can add another dimension of control and significantly improve user efficiency and experience. The challenge is in creating both natural feel soft touch feedback and 2D or 3D analogue touch pressure signals simultaneously, with fewer electrodes/traces and sensor elements.

Aspects and embodiments of the present invention have been devised with the foregoing in mind.

SUMMARY OF THE INVENTION

According to a first aspect of the invention, there is provided a sensor device. The sensor may comprise a plurality of electrode portions configured to provide one or more electrical signals. It may also comprise a non-conductive material provided on or over the plurality of electrode portions. The sensor device may be configured to provide one or more electrical signals in response to a change in capacitance between at least one of the plurality of electrode portions and a conductive object being near to or in contact with the non-conductive material. Alternatively or additionally, the sensor device may be configured to provide one or more electrical signals in response to a change in capacitance between at least one of the plurality of electrode portions and at least one other of the plurality of electrode portions.

The device may comprise one or more electrodes. The plurality of electrode portions may form at least a part of the one or more electrodes. Different electrode portions may be on the same or different electrodes. One or more of the plurality of electrode portions may be physically and/or electrically connected. One or more of the plurality of electrode portions may be physically and/or electrically disconnected from one or more other electrode portions. Each of the plurality of electrode portions may form at least a part of the same electrode. Alternatively, each of the plurality of electrode portions may be or form at least a part of a separate electrode. Alternatively, the device may comprise a plurality of electrodes, wherein each electrode comprises one or more of the plurality of electrode portions.

One or more of the plurality of electrode portions may be formed of or comprise a thermo-formable conductive material. The non-conductive material may be formed of or comprise a thermo-formable material.

For example, one or more of the plurality of electrode portions and/or the non-conductive material may be formed of or comprise a material that is not deposited, plated, evaporated or grown.

Advantageously, the conductive electrodes may be non-metallic and fully mouldable into any predefined 3D shape. The shape may be specifically chosen or designed to provide different user interactive functions (e.g. touch sensing, trackpads, pressure sensing, and push/pull/twist switches). Furthermore, the use of substantially large non-metallic electrodes reduces the number of metal tracks/wires needed to produce the sensor device and significantly simplifies the manufacturing of the sensor device compared to traditional sensing technologies. The electrodes may be over-moulded with a thermo-formable non-conductive material which is flexible, pliable and deformable to provide soft touch feedback. The flexibility further allows a degree of relative movement between the conductive electrodes which can provide additional mechanical functionality (e.g. changing gap sizes in response to a user pushing or pulling the electrodes) without using additional mechanical parts. The 3D design of electrodes further allows for devices to operate in response to interactions with conductive and/or non-conductive objects. Advantageously, the operation of the device relies on the capacitive interaction between separate electrode portions and/or a capacitive interaction between a conductive object (e.g. a user's finger) and one or more of the electrode portions.

Interactions with the electrode portions therefore involve movement of a conductive object near to and/or across the non-conductive material, and/or applying a force or pressure to the non-conductive material. Force sensing (e.g. Z direction) can be achieved by a conductive or non-conductive object urging one electrode portion towards another to change the capacitance between them. Touch sensing (e.g. XY direction) is reliant upon a conductive object (e.g. a finger) being/moving near to an electrode portion. These two functionalities can be combined or used separately, e.g. in the same or different areas of the device. Therefore, aspects and embodiments of the invention advantageously offer both analogue (or digital) location touch (XY) sensing and pressure/force (Z) sensing simultaneously. Electrode portions are used for all sensing measurements, but in differing ways. The touch sensing may be particularly useful in applications such as trackpads, and the pressure/force sensing e.g. for push/pull/twist switches, One or more of the plurality of electrode portions and/or the non-conductive material may be formed by a moulding process. The non-conductive material may be over-moulded on or over the plurality of electrode portions.

At least one of the plurality of electrode portions and/or the non-conductive material may have, at least in part, a three-dimensional form. Additionally, at least one of the plurality of electrode portions may have, at least in part, a planar form. For example, one or more of the electrode portions and/or the non-conductive material may have a thickness e.g. greater than that of a film or coating (such as a printed ink), e.g. greater than 0.5 mm or 1 mm. One or more of the electrode portions and/or the non-conductive material may be formed as layer. The thickness of the layer may be substantially uniform or non-uniform. The non-conductive material may be formed on or over the plurality of electrode portions so as to substantially conform to the profile of one or more of the plurality of electrode portions. The non-conductive material may further be formed between the electrode portions.

The plurality of electrode portions and the non-conductive material may be formed, optionally or preferably by moulding, to comprise one or more user interactive areas. The one or more user interactive areas may be or comprise a touch interactive area such as a trackpad, or a force interactive area such as a push, pull, twist and/or toggle switch.

A gap may be present between respective, e.g. adjacent, electrode portions. For example, one electrode portion may be separated from another electrode portion by a gap. The non-conductive material may be further provided in the gap(s). Alternatively, the gap may be or comprise a void or an air gap. In an embodiment, the electrode portions are substantially in the same plane, with gaps between them in the same plane. In other embodiments, the electrode portions and gaps need not be arranged in the same plane.

One or more of the plurality of electrode portions may be configured to move relative to at least one other electrode portion in response to a force or pressure applied to the non-conductive material. The non-conductive material may be adjacent to the said electrode portions. Relative movement between said electrode portions may cause a change in capacitance between them. The change in capacitance provides a change in the one or more electrical signals.

When a force or pressure is applied (e.g. to the non-conductive material), movement of one or more of the electrode portions may change the gap(s). The change in the gap(s) may cause a change in capacitance between said electrode portions them, detectable in the one or more electrical signals.

The device may further comprise a projection. The projection may be formed in the non-conductive material. The projection may be configured or arranged for a user to grip, move, and/or apply a force or pressure to (e.g. push, pull, squeeze/compress, twist). For example, the projection may have a specific 3D shape that a user can grip/move. The device may be configured such that movement of the projection may cause relative movement between the one or more electrode portions and at least one other of the plurality of electrode portions. For example, one or more of the plurality of electrode portions may extend into the projection.

The device may be configured to detect push, pull and/or twist movements of the projection. For example, each type of movement or force applied to the projection may results in unique and/or identifiable change in the one or more electrical signals.

The device may be further configured to provide a change in the one or more electrical signals in response to movement of a conductive object across the non-conductive material. The conductive object may be in contact with the surface of the non-conductive material or near to the surface of the non-conductive material. For example, the conductive object may be above or within a certain range of at least one of the plurality of electrode portions in order to interact capacitively with it.

At least one of the plurality of electrode portions may be shaped and arranged to provide the one or more electrical signals in response to linear and/or circular movements of a conductive object across the non-conductive material.

At least one of the plurality of electrode portions may comprises one or more hollows and/or recesses to provide a predetermined resistance between any two given points on the electrode portion(s). For example, there may be a plurality of hollows and/or recesses forming a regular array. The one or more hollows and/or recesses may define a non-linear conduction path between the two points. Alternatively or additionally, the one or more hollows and/or recesses may define a plurality of linear and/or non-linear conduction paths between the two points.

At least one of the plurality of electrode portions may be or comprise a complex shape and/or a repeating geometric pattern to provide a predetermined resistance between any two given points.

Advantageously, forming one or more of the electrode portions in a complex shape and/or with one or more hollows and/or recesses can increases the resistance between any two given points on the electrode portion(s) or an electrode comprising said electrode portions without changing the resistivity of the conductive material. Increasing the resistance between two points increases the change in the electrical signal as a conductive object travels across the distance between the two points, thus increasing the sensitivity of the device and/or the position sensing resolution.

Each electrode/electrode portion may be formed in a simple or complex shape. At least two adjacent electrode portions may be configured to overlap in one or more directions, either in contact or not in contact with each other. For example, the one or more directions may be the X, Y or Z directions, or any other direction. The at least two adjacent electrode portions may be configured to interdigitate with each other. The interdigitating portions may be configured so as not to occupy the same overlap area with a conductive object. The electrode portion(s) may have one or more fingers or projections that can be interposed between each other.

Alternatively or additionally, the plurality of electrode portions and/or the non-conductive material may have, at least in part, a three-dimensionally profiled surface. The one or more electrical signals may change in response to movement of the conductive object over the surface of the non-conductive material.

The non-conductive material may be formed of or comprise a substantially flexible, deformable or pliable material. For example, the non-conductive material may be deformable at least in a thickness direction. Alternatively, the non-conductive material may be formed of or comprise a substantially rigid material.

The plurality of electrode portions may be formed of or comprise a substantially rigid conductive material. Alternatively, the plurality of electrode portions may be formed of or comprise a substantially flexible, deformable or pliable conductive material. For example, the conductive material may be deformable at least in a thickness direction.

The thermo-formable conductive material may be or comprise one or more of: silicone rubber comprising conductive material, conductive natural rubber, and a conductive plastics material. For example, the conductive plastics material may be or comprise one or more of conductive polyurethane, conductive thermoplastic elastomer, and conductive acrylonitrile butadiene styrene.

The non-conductive material may be or comprise one or more of silicone rubber, natural rubber, a plastics material, and thermo-formed fabrics or synthetic leather. For example, the plastics material may be or comprise one or more of polyurethane, thermoplastic elastomer, and thermoplastic polyurethane.

According to a second aspect of the invention, there is provided a method of manufacturing a sensing device according to the first aspect. The method may comprise an over moulding process. The over moulding process may comprise forming the non-conductive material over the plurality of electrode portions, or vice versa. The method may comprise first forming the plurality of electrode portions or the non-conductive material and then forming the other of the plurality of electrode portions or the non-conductive material over the plurality of electrode portions or the non-conductive material that was formed first.

According to a third aspect of the invention, there is provided a method of sensing an electrical signal using a sensor device according to the first aspect. The method may comprise selectively bringing a conductive object near to, in contact with and/or or across the non-conductive material. Alternatively or additionally, the method may further comprise selectively applying a force or pressure to the non-conductive material to cause relative movement between the at least one of the plurality of electrode portions and the at least one other of the plurality of electrode portions.

According to a fourth aspect of the invention, there is provided a system comprising a sensor device according to the first aspect and a measurement apparatus. The measurement apparatus may be configured, in use, to receive one or more electrical signals from the sensor device. The measurement apparatus may comprise instructions to process the one or more electrical signals from the sensor device over a period of time and determine, from variations or characteristics in the one or more electrical signals, a location of a touch on the sensor device with a conductive object, a speed of movement of the conductive object across the device, a direction of movement of the conductive object, a pressure exerted on the non-conductive material, and/or a direction of movement of at least one of the plurality of electrode portions relative to another of the plurality of electrode portions.

According to a fifth aspect of the invention, there is provide an automobile control system comprising a sensor device according to the first aspect.

According to a sixth aspect of the invention, there is provided a virtual reality control system comprising a sensor device according to the first aspect.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and these embodiments are specifically envisaged.

BRIEF DESCRIPTION OF DRAWINGS

In order that the invention can be well understood, embodiments will now be discussed by way of example only with reference to the accompanying drawings, in which:

FIGS. 3A and 3B show the sensor device of FIG. 2 with textured surfaces;

FIG. 3C shows an example output signal generated from the sensor devices of FIGS. 3a and 3b;

FIG. 7B shows a top view of conductive electrodes from the sensor device of FIG. 6a;

FIG. 7C shows corresponding exemplary output signals from the sensor device of FIG. 7a;

FIG. 8B shows the conductive electrodes from the sensor device of FIG. 8a;

FIG. 8C shows corresponding exemplary output signals from the sensor device of FIG. 8a;

FIG. 9 shows an exemplary output signal from the sensor device of FIGS. 7a and 8a;

FIG. 10B shows a semi-transparent view the sensor device of FIG. 10a;

FIG. 10C illustrates exemplary user interactions detectable by the sensor device of FIG. 10a;

FIG. 11B shows a simplified diagram of part of the sensor device of FIG. 11a;

DETAILED DESCRIPTION

Aspects and embodiments of the invention comprise a layer of electrically conductive "sensing" material covered by a non-conductive "interface" layer that a user interacts with. The conductive sensing material can form a network of discrete electrodes that are bound, supported and electrically isolated by the non-conductive interface material to form a complete seamless assembly. The layers are arranged to provide user interface devices with wide range of touch sensing and tactile user interactive functionalities.

Key to understanding the invention is the use of the smart conductive sensing material that is designed and formed to have specific 3D shapes (e.g. cross-sections, profiles and/or surface contours) and resistivity that allows the resistance between any two given points to be distinguished, in a way that may not otherwise be achievable. As explained in more detail below, the 3D shape may be substantially planar in profile, and/or include a repeated surface profile patterns, hollows and/or net or mesh array type structures. In addition, the 3D shape of the conductive sensing material may allow the device to exhibit certain intended mechanical properties, such as malleability and/or flexibility when deformed to extend the functionality of the sensing technology. The 3D design of electrodes formed from the conductive sensing material allows for devices to operate in response to interactions with conductive and/or non-conductive objects.

The conductive sensing material may be rigid, soft, pliable and/or deformable, depending on the application. The interface material may be rigid but is preferably soft, pliable and/or deformable in order to provide soft tactile feedback to the user and further device functionalities.

Figure 1:
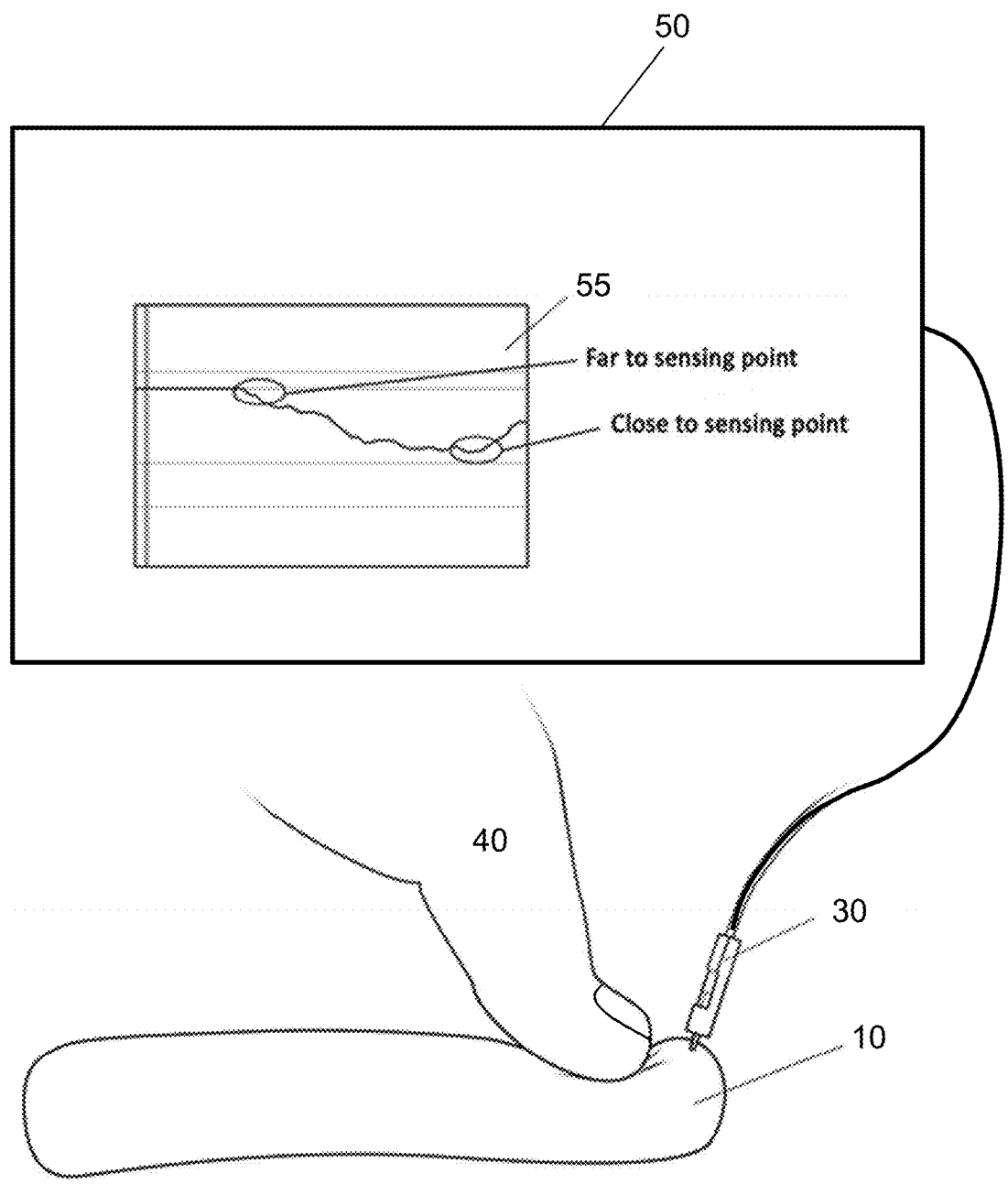
FIG. 1 illustrates a prior art sensor device comprising a layer of conductive material.

FIG. 1 shows a piece of conductive sensing material 10 connected to a measurement apparatus 50 at a wiring or sensing point 30. As is disclosed in the applicant's earlier application, PCT/EP2016/025067, contacting, pressing and/or moving a conductive object 40 (such as a human finger, as shown) across the surface of the conductive sensing material 10 causes a detectable change in the output signal measured at the wiring point 30. The output signal 55 is preferably a time varying electrical signal such as a capacitance or voltage reading, as depicted in FIG. 1. In this case, touching the conductive sensing material 10 with a conductive object 40 grounds it, causing a change in the capacitance and/or voltage at the area of contact on the surface that can be detected by the measurement apparatus 50 as a change in the output signal 55. The reading is proportional to the contact area. In this example, the conductive sensing material 10 is soft and pressure sensitive. Pressing harder on the conductive sensing material may result in a larger change in the output signal 55.

The conductive material 10 may be formed in any predefined 3D shape and may comprise a 3D profiled or textured surface configured to create a unique tailored change in said output signal 55 in response to movement of the conductive object 40 thereacross, as described in PCT/EP2016/025067. The unique change in the output signal 55 can be detected and translated into a signal to control an electronic device/system e.g. a volume, movement or lighting control. The unique output signal 55 produced from a textured surface may be also used to aid the determination of position, speed and direction of movement of the conductive object 40. The textured surface may also provide tactile feedback when manipulated or touched by a person.

Capacitive touch sensing is reliant on the conductive object 40 being in contact or near the conductive material 10. The above described sensing concepts therefore also apply to cases where the conductive material 10 is covered by a non-conductive material 20.

Figure 2:
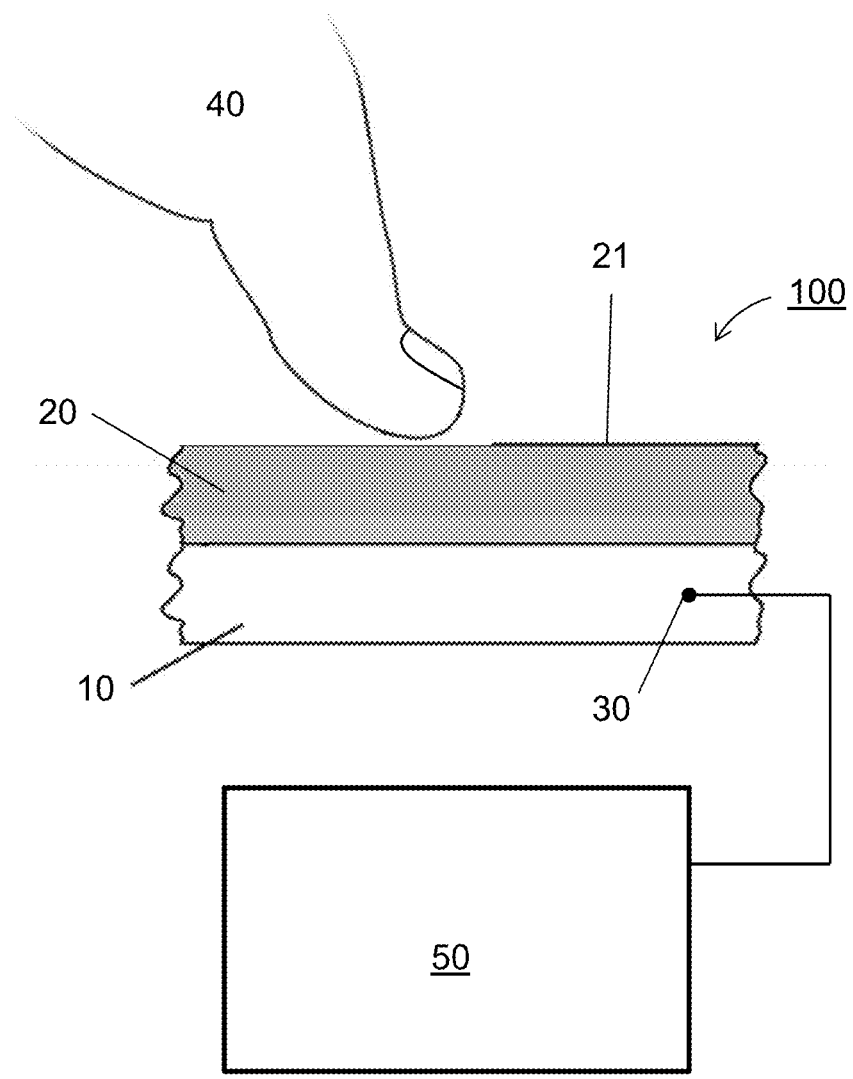
FIG. 2 shows a cross-sectional view of a sensor device according to an embodiment of the invention comprising a layer of conductive material covered by a layer of non-conductive material.

An embodiment of the invention showing a multi-layer device 100 is shown in FIG. 2. In this case, contacting, pressing and/or moving a conductive object 40 across the surface of the non-conductive material 20 causes a detectable change in the output signal 55. Here, the conductive object 40 interacts with the conductive material 40 capacitively to alter the voltage and/or capacitance at the area of contact and cause a detectable change in the output signal 55. The output signal 55 generated is proportional to the overlap area of the conductive object 40 and the conductive material 10. The output signal 55 generated is also inversely proportional to the separation between the conductive object 40 and the conductive material 10.

The device 100 will respond to mere contact or touch of the conductive object 40 with the surface 21 of the non-conductive material 20. The device 100 may also respond to proximity of the conductive object 40 to the surface 21 of the non-conductive material 20. For example, the device 100 may detect the presence of a conductive object 40 within a pre-defined range from the surface 21 of the non-conductive material 20. Where the non-conductive material 20 is substantially soft or deformable, the device 100 may further be pressure/force sensitive. That is, pressing harder on the surface 21 of the non-conductive material 20 may generate a larger output signal 55, e.g. due to a reduction in the separation between the conductive object 40 and the conductive material 10 and/or any deformation of the underlying conductive material 10.

Although FIGS. 1 and 2 show arrangements with a single wiring point 30 on the conductive material 10, i.e. a single point measurement, two or more wiring points 30 may be present on the conductive material 10 and used in a multi-point measurement. Each wiring point 30 may provide a separate, different output signal 55 that the measurement apparatus 50 can detect and process to determine a touch location, speed and/or direction of movement.

The measurement apparatus 50 may comprise a computing or processing device (e.g. one or more microcontrollers) and may be configured to host instructions for enabling processing of the output signal(s) received from the device 100. For example, the computing or processing device may be configured to derive touch location, speed and direction from the output signal(s) received from one or more wiring points on one or more sections of conductive material 10, in near real time.

The measurement apparatus 50 may include a processor, a storage device, and a non-transient machine-readable storage medium (not shown). The machine-readable storage medium may include instructions which control how the processor receives input data and transforms the input data (the output signal(s) from the device 100) into output data e.g. on a display, a connected printing device or via an audio output, or a control signal for an auxiliary device or system.

The device 100 may further be connected to an intermediary processing device comprising signal processing means provided for converting the output signal(s) from the device 100, via one or more wires or electronic connectors (not shown). Then, the intermediary device may be connected (wired or wirelessly) to the measurement apparatus 50 via appropriate connection means, e.g. a USB port or wireless technology. The wireless technology may be Bluetooth, WiFi, IR, etc. The measurement apparatus 50 may be configured to display the measured signal(s) and/or information representative of that signal(s) and/or provide an interaction with a software application caused by the signal.

The conductive material 10 may be substantially rigid, soft, deformable and/or flexible depending on the application. The conductive material 10 may be or comprise a thermo-formable material. In embodiments, the conductive material 10 may be or comprise: silicone rubber containing conductive material such as conductive particles and optionally carbon filler; silicone rubber mixed with graphite or carbon nanotubes (CNT); conductive rubber; and/or a conductive plastic including conductive polyurethane, conductive thermoplastic elastomer (TPE), and/or conductive acrylonitrile butadiene styrene (ABS). The material can have a range of hardness properties (e.g. depending on the silicone base) with controllable conductivity (e.g. depending on the conductive material content). The conductive material 10 may also comprise a stretchable fabric layer and/or electrically conductive paint e.g. on one of its sides.

The conductive layer 10 may be or be formed of a single material, and/or formed from a single moulding without needing any assembly of parts. The conductivity of the conductive material 10 can vary across and through the conductive material 10. In other words, the conductivity of a unitary piece of conductive material 10 can be modulated. This can be achieved by varying the concentration of the conductive component within the conductive material 10 so as to provide areas of different conductivities. This may also be achieved by modulating conductive components or separating conductive areas (e.g. applying conductive materials to separate areas on one piece of conductive material). Areas of different conductivities will produce a different electrical output signal 55. As such, even if two areas of a conductive material 10 were profiled in the same way, if these areas had different conductivities, moving a conductive object 40 across their surfaces would generate different electrical signals enabling them the be distinguished. In this alternative/additional way, the location of the moving finger/object on can be detected.

The conductive material 10 may comprise, in part, non-conductive regions. Embodiments of the invention can therefore provide one or more areas in the conductive material 10 of relatively higher or lower conductivity, zero or near-zero conductivity as compared with the rest of the material.

The non-conductive material 20 may be substantially rigid, soft, deformable and/or flexible depending on the application. The conductive material 10 may be or comprise a thermo-formable material. In embodiments, the non-conductive material 20 may be or comprise: silicone rubber; natural rubber; and/or a plastics material including polyurethane, TPE, Hytrel™ (a type of TPE from Du Pont), thermoplastic polyurethane (TPU) and/or thermo-formed fabrics or synthetic leather. The non-conductive material 20 can have a range of hardness properties (e.g. depending on the silicone base).

The conductive material 10 and/or the non-conductive material 20 may be formed by a moulding process. For example, injection moulding, thermo-forming, extrusion, compression moulding, blow moulding and/or heat pressing. Advantageously, such thermo-forming processes allow the conductive material 10 and/or non-conductive material 20 to be formed in almost any 3D shape, in large quantities and over large areas with a high degree of repeatability, and at relatively low cost.

Alternatively or additionally, a 3D printing process may be used to form at least a part of the conductive material 10 and/or the non-conductive material 20 layers. 3D printing may be appropriate in cases where intricate shapes and details are required.

Alternatively, the forming process may comprise one or more cutting steps. For example, the conductive material 10 may first be moulded and then cut into the predefined 3D shape and/or pattern. Any known subtractive cutting process may be used, for example, laser cutting, milling or etching.

In an embodiment, the conductive material 10 is formed first and then the non-conductive material 20 is formed over the conductive material 10. Such a process may be referred to as "over moulding". In such a case, a requirement is that the moulding temperature of the non-conductive material layer 10 (i.e. the over moulded layer) is lower than the moulding temperature of the conductive material layer 10 in order to avoid re-flowing the conductive layer 10 and intermixing of the two layers 10, 20. Alternatively, there may be applications where the conductive material 10 is formed over the non-conductive material 20. In either case, the material with the higher moulding temperature must be moulded first.

Alternatively or additionally, the conductive material 10 and/or the non-conductive material 20 may be formed separately and then assembled or bonded together. This may be necessary, for example, where the moulding temperatures of the two materials are similar, or where an additional layer of conductive material 10 is needed on top of the non-conductive material layer 20, or vice versa.

As described above, the conductive material 10 and/or the non-conductive material 20 of the device 100 may be formed in any predefined 3D shape and may comprise a 3D profiled or textured surface configured to create a unique change in the output signal(s) 55 in response to movement of the conductive object 40 thereacross, and/or provide tactile feedback when manipulated or touched by a person. An example of a device 100 having a profiled surface 21 of the non-conductive layer 20 and profiled surface 11 of the conductive layer 10 is shown in FIGS. 3A and 3B, respectively. The profiled surface 11, 21 may be textured e.g. with a regular or irregular geometric pattern. The geometric pattern may be formed by a variation in elevation and/or depression across the surface 11 of the conductive material 10. The geometric pattern may comprise a plurality of discontinuities and/or undulations. The geometric pattern may comprise a plurality of peaks 12 and troughs 14 across the surface 11 in a pattern, as shown in FIGS. 3A and 3B. The height, depth and/or width of the peaks 12 and troughs 14 need not be equal. Further examples of 3D profiled surfaces are shown in FIGS. 19A-G (although only the conductive material 10 is shown, it will be appreciated that the example patterns apply equally to the non-conductive layer 20).

Whether the surface 11 of the conductive material 10 or the surface 21 of the non-conductive material 20 is profiled/textured, a unique and identifiable change in output signal 55 may be generated due to the capacitive nature of the interaction between the conductive object 40 and the conductive material 10. FIG. 3C shows a simple illustration of the type of output signal 55 variation that may be observed by moving a conductive object 40 across a device 100 with a textured surface 11 or surface 21 (e.g. as shown in any of FIGS. 3A, 3B and FIGS. 19A-G). The measurement apparatus 50 may be configured to interpret the output signal 55 to determine the position, speed and direction of the movement of the conductive object 40. For example, the measurement apparatus 50 may be configured to count the number of oscillations or peaks/troughs in the output signal 55 and/or their frequency and match the observed time varying signal and/or signal properties with pre-stored profile data.

Figure 4A:
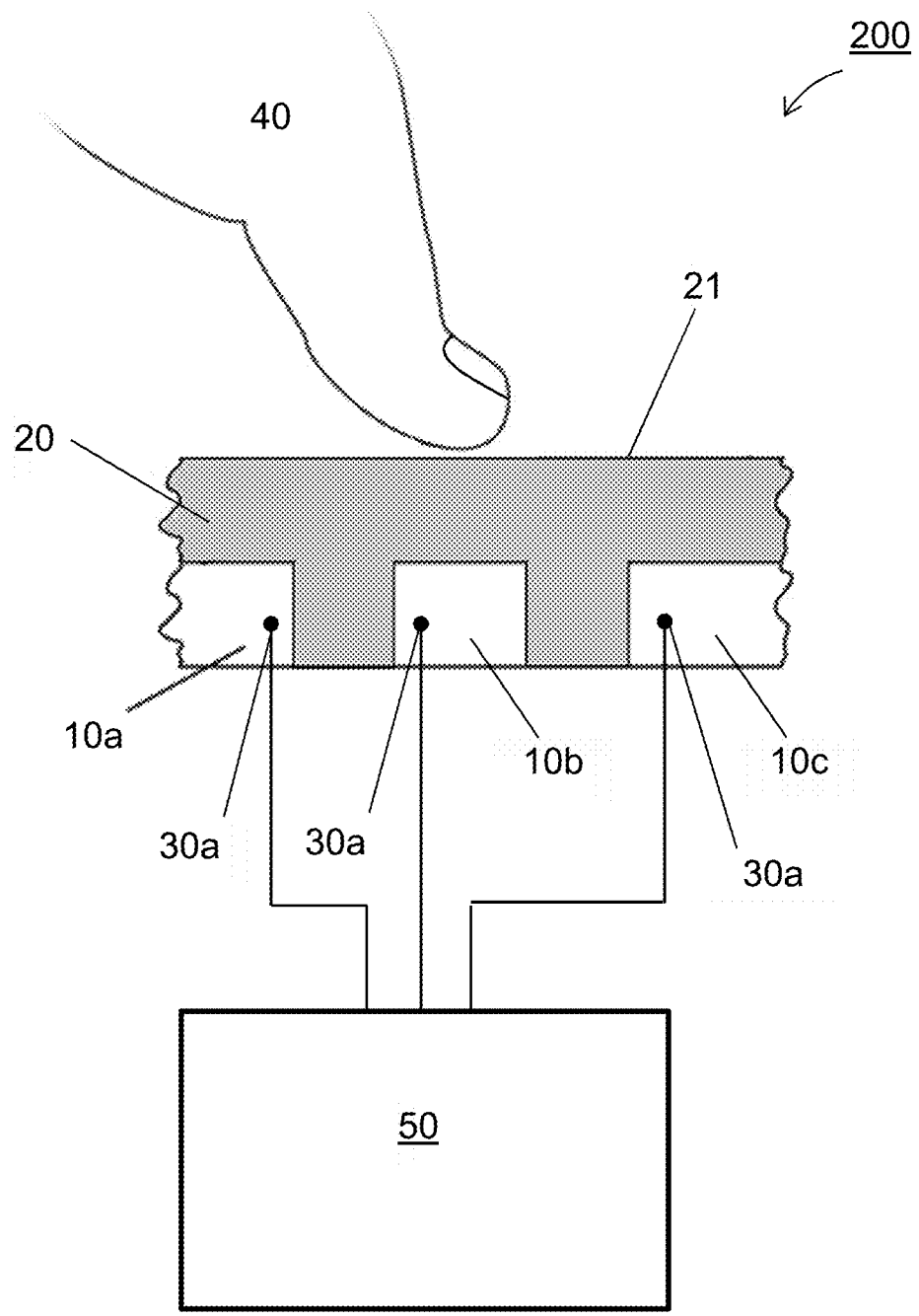
FIG. 4A shows a cross-sectional view of a sensor device comprising multiple separate conductive electrodes beneath a layer of non-conductive material.

FIG. 4A shows an example device 200 comprising conductive material 10 that has been molded (or cut) to form a plurality of separate conductive portions or elements 10a, 10b, 10c that are covered with (or over molded with) the non-conductive material 20. Although three conductive elements are shown, the device 200 may comprise any number of conductive elements. Each conductive element 10a, 10b, 10c may be physically separated and electrically isolated from a neighboring element 10a, 10b, 10c by the non-conductive material 20. As such, each conductive portion or element 10a, 10b, 10c may form part of a separate (unitary) electrode. Alternatively or additionally, each conductive element 10a, 10b, 10c may be physically and/or electrically connected, as shown schematically in FIG. 4B. In this case, each conductive portion or element 10a, 10b, 10c may form part of the same electrode.

Each of the plurality of conductive elements 10a, 10b, 10c may be connected to a measurement apparatus 50 at a respective wiring/measuring point 30a, 30b, 30c. In this way, the plurality of conductive elements 10a, 10b, 10c form a network of sensing electrodes connectable to the measurement apparatus 50 for performing touch sensing measurements across an extended area.

Advantageously, the network of electrodes 10 may be formed simultaneously using a single mould having predefined 3D electrode shapes, spacings and arrangements with the thermo-forming process describe above. Alternatively, each electrode 10 may be formed/moulded separately and assembled into place before a subsequent over moulding process with the non-conductive material 20.

In use, when a conductive object 40 moves close to, touches, or moves across the surface 21 of the non-conductive material 20, an output signal is generated from one or more wiring/measuring points 30a, 30b, 30c that can be detected in near real time by the measurement apparatus 50. The measurement apparatus 50 may be configured to scan through each wiring/measurement point 30a, 30b, 30c on the device 200 sequentially (i.e. one by one) to measure the each output signal separately. For example, the measurement apparatus 50 may comprise a multiplexer function. The scan frequency may be sufficiently high compared to a typical movement speed of the conductive object 40 to minimise any measurement lag, such that a user perceives the measurement/detection to be in real-time. For example, the scan rate may be in the range 100-200 Hz. The scan rate may be slower or faster depending on the application.

Figure 4B:
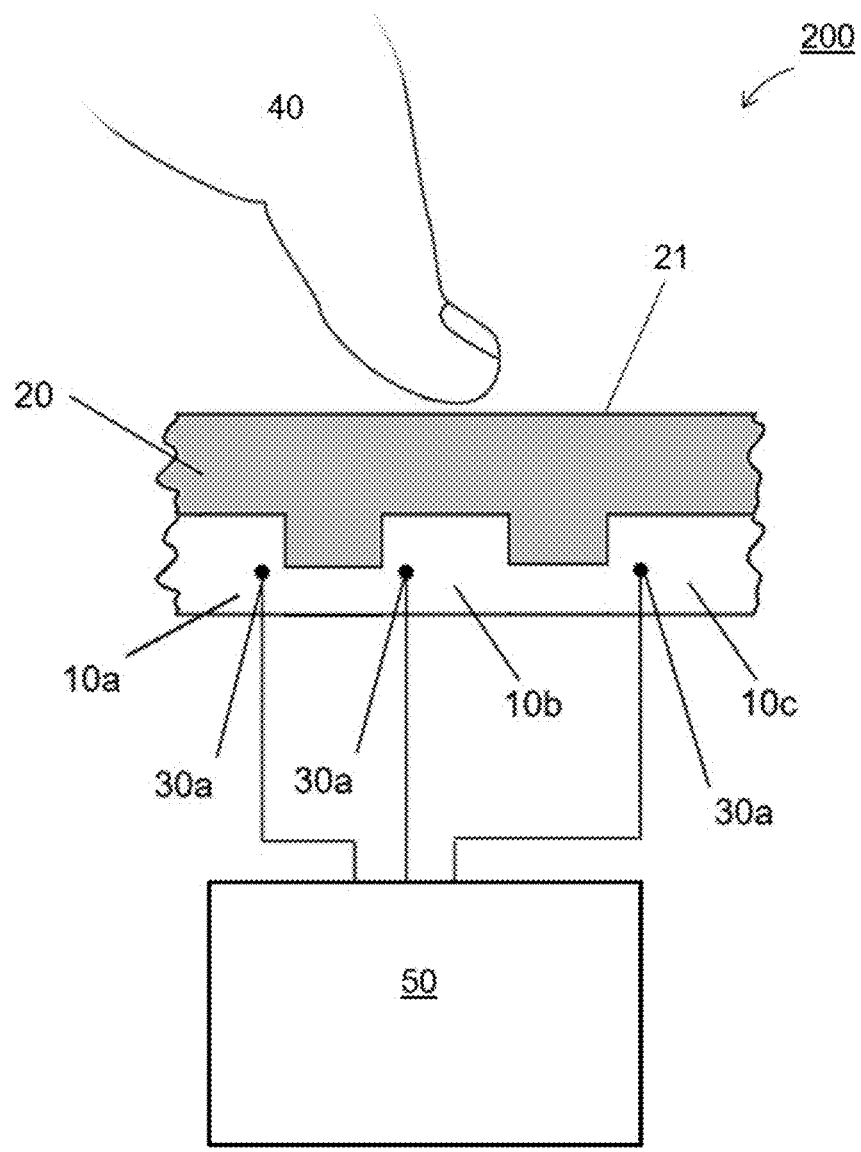
FIG. 4B shows a cross-sectional view of another sensor device comprising multiple connected conductive electrodes beneath a layer of non-conductive material.

Advantageously, scanning through the wiring points 30a, 30b, 30c one by one ensures that signals are sent and/or received to/from one wiring point 30a, 30b, 30c at a time, and therefore no short circuits are formed between any given pair of wiring points. The scanning method also allows the conductive elements 10a, 10b, 10c to be physically connected and therefore be molded using one mold, e.g. as shown in FIG. 4B. The scanning method will be discussed in further detail below with reference to FIGS. 14-18.

Although each conductive element 10a, 10b, 10c in FIGS. 1(*a*) and 4(*b*) 4A and 4B is shown as having a single wiring/measurement point 30a, 30b, 30c, in other examples, each conductive element 10a, 10b, 10c may have any number of wiring/measurement points, each wiring/measurement point providing a separate output signal 55 to the measurement apparatus 50 from a strategic point in the conductive element 10a, 10b, 10c. In addition, although FIGS. 1(*a*) and 4(*b*) 4A and 4B shows each conductive elements 10a, 10b, 10c connected to a single measurement apparatus 50, in other examples more than one measurement apparatus 50 may be used to measure the output signal(s) 55 from the or each wiring point 30a, 30b, 30c on the or each conductive element 10a, 10b, 10c.

Figure 5:
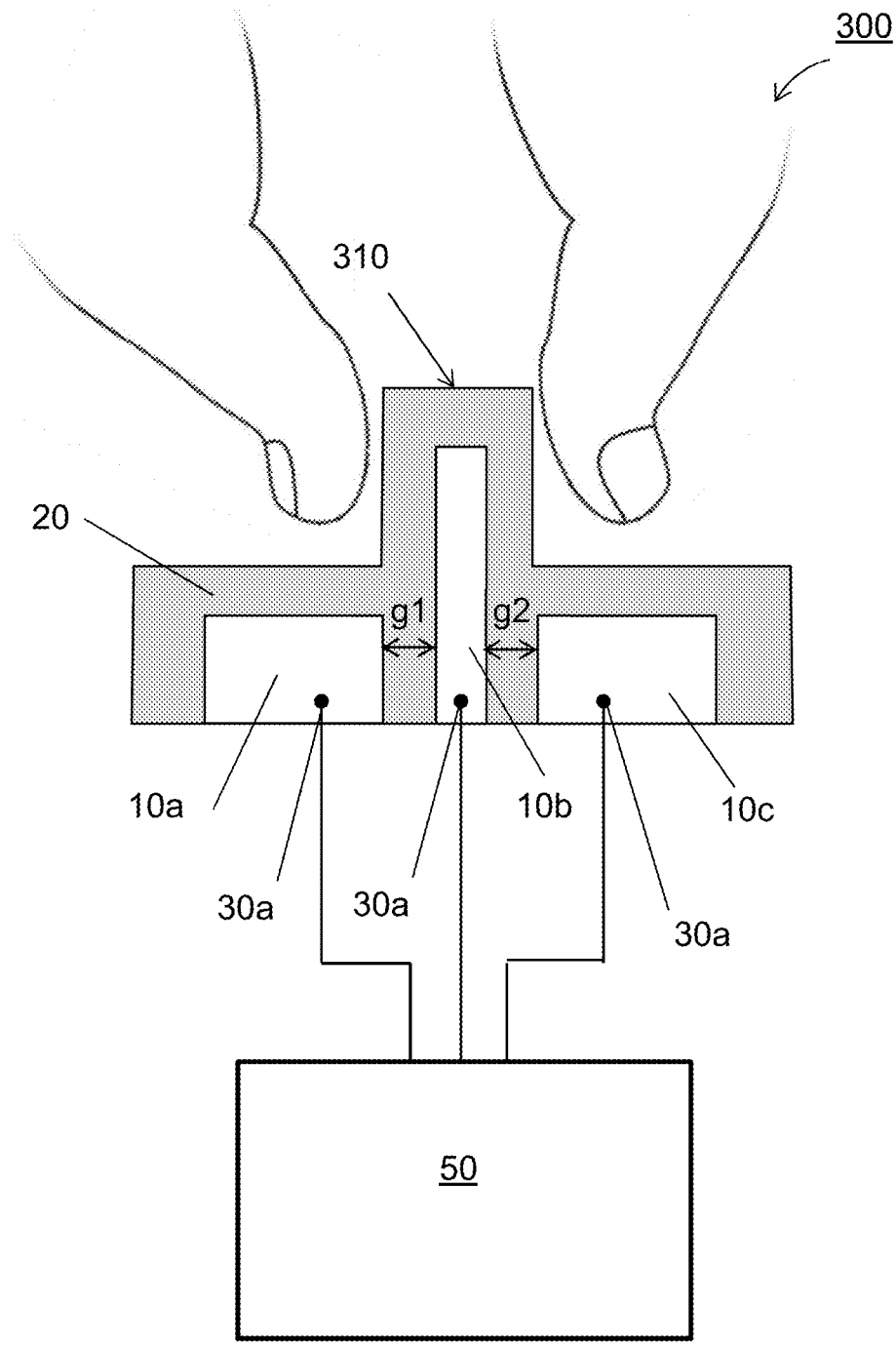
FIG. 5 shows a cross-sectional view of another sensor device comprising multiple conductive electrodes beneath a layer of non-conductive material.

FIG. 5 shows another example device 300 comprising three conductive elements or portions 10a, 10b, 10c covered in non-conductive material 20. Each conductive element 10a, 10b, 10c has a respective wiring point 30a, 30b, 30c for connection to the measurement apparatus 50. The three conductive elements 10a, 10b, 10c are arranged substantially side by side to form gaps g1 and g2 between adjacent conductive elements. The gaps g1 and g2 may be designed such that a pre-defined capacitance can be measured between a given pair of adjacent conductive elements 10a, 10b, 10c.

In device 300, the non-conductive material 20 may be substantially soft and/or deformable to allow the relative positions of one or more of the conductive elements 10a, 10b, 10c to be changed/manipulated by a user. Any relative movement between a pair of adjacent conductive elements 10a, 10b, 10c that changes the gap g1 and/or the gap g2 will cause a change in the capacitance between the or each pair, which can be detected by the measurement apparatus 50. As such, the operation of the device 300 relies on the capacitive interaction between adjacent conductive elements 10a, 10b, 10c, rather than a capacitive interaction between a conductive object 40 (e.g. a user's finger) and the conductive elements 10a, 10b, 10c. As such, the device 300 can provide varying output signals 55 in response to user interactions via a conductive object 40 or a non-conductive object (e.g. where a user wears gloves). Although three conductive elements 10a, 10b, 10c are shown in FIG. 5, it will be appreciated that the device 300 may instead comprise two conductive elements with a single gap between them, or more than three conductive elements. Further, although the conductive elements 10a, 10b, 10c are shown in FIG. 5 as separate elements, in an alternative embodiment, one or more of the conductive portions may be physically and/or electrically connected (see, e.g. FIG. 11B).

Preferably, the device 300 comprises at least one projection 310 to provide a leverage or grip point 310 for the user to move one or more of the conductive elements 10a, 10b, 10c. In the example of FIG. 5, the device comprises a single projection 310 and the central conductive element 10b extends into the projection 310. A user may therefore grip the projection 310 and move it, e.g. with tilting, pulling, pushing or twisting action, to deform the non-conductive material 20 and cause a change in the output signal(s). In this example, the conductive material 10 may be substantially rigid compared to the non-conductive material 20, such that the non-conductive material 20 can deform around the conductive elements 10a, 10b, 10c. For example, the conductive material 10 may comprise ABS or TPU.

In an embodiment, the conductive element 10b extending into the protrusion 310 may be grounded when performing measurements. Grounding the conductive element 10b handled/moved by the user may minimise any capacitive influence the user's finger may have on the output signals from the other conductive elements 10a, 10c, e.g. by shielding it out.

As described in more detail with reference to FIG. 8 below, where the conductive material 10 is substantially rigid, at least one of the conductive elements 10a, 10b, 10c can be designed to flex, bend or deform upon a user applying a force to move it by integrating one or more strategic hollows and/or overhanging structures in the at least one of the conductive elements 10a, 10b, 10c.

Additional mechanical and/or electrical components may be included in the device 100, 200, 300 to enhance the visual and/or tactile feedback to the user, such as LEDs, printed icons, moveable parts for push/pull/twist interactions and/or haptic feedback, as will discussed in more detail below. For example, such additional components can be integrated into the non-conductive material 20 in the over-moulding process.

Due to the forming process, the non-conductive material 20 and the electrodes formed from the conductive material 10 may take any arbitrary 3D shape and conform to any footprint or surface. This enables devices 100, 200, 300 to be designed and formed to have specific 3D shapes and be fully integratable with another 3D shaped component, e.g. an automobile interior. It also allows the resistance of the conductive material 10 between any two given points to be distinguished, in a way that may not otherwise be achievable.

Figure 6:
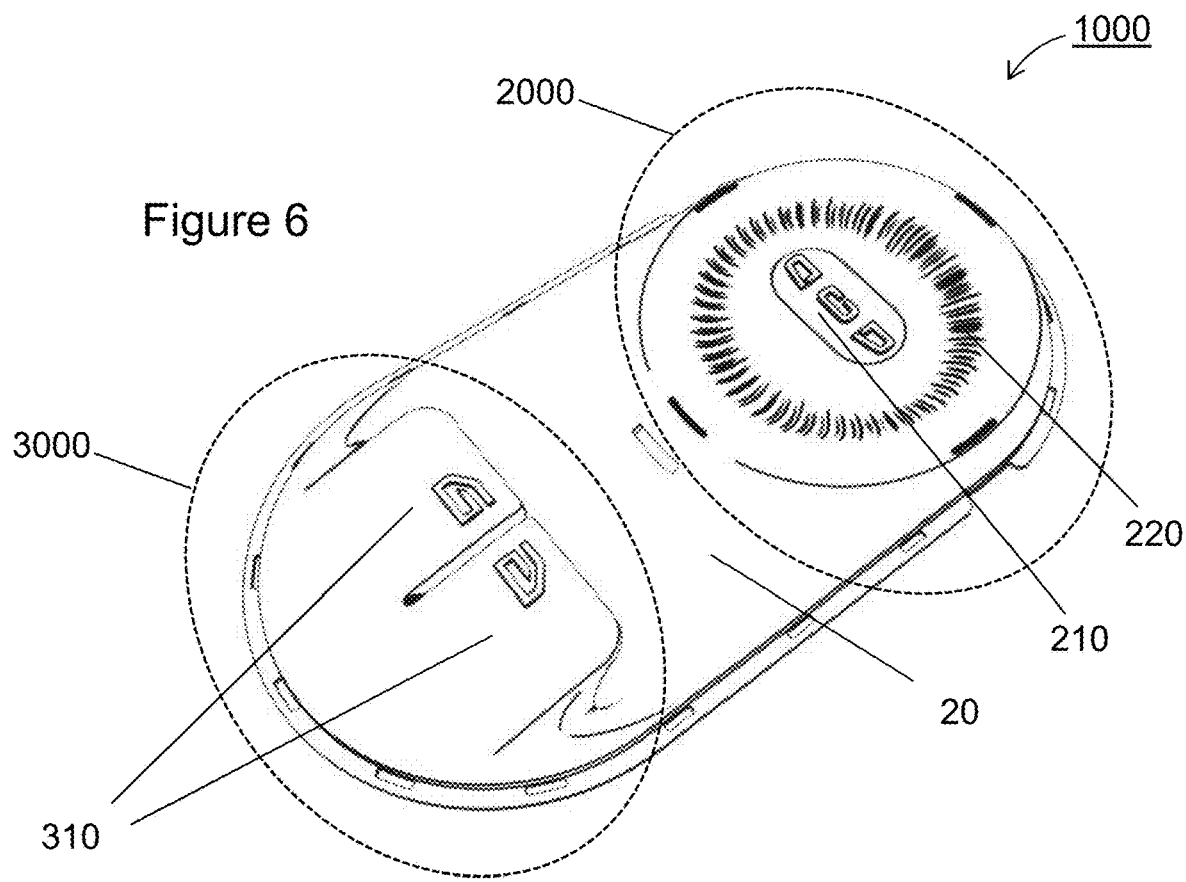
FIG. 6 shows another sensor device.

FIG. 6 shows an assembly 1000 that may form part of a control system in an automobile interior. The assembly 1000 includes a device 2000 comprising three touch switches 210 (e.g. for selecting which mirror to control), and a wheel shaped trackpad 220 (e.g. for controlling the selected mirror). The assembly 1000 further includes a device 3000 comprising a pair of push/pull buttons 310 that may be used, for example, for window control. In the view shown in FIG. 6, the entire assembly 1000 has an exterior layer of non-conductive material 20 and provides a tactile touch interface to a user. The non-conductive material 20 may comprise one or more areas with a textured surface (as shown in FIG. 6) to mark or indicate the trackpad 220 to the user, aid in determining the position of the user's finger and/or provide tactile feedback to the user.

Figure 7A:
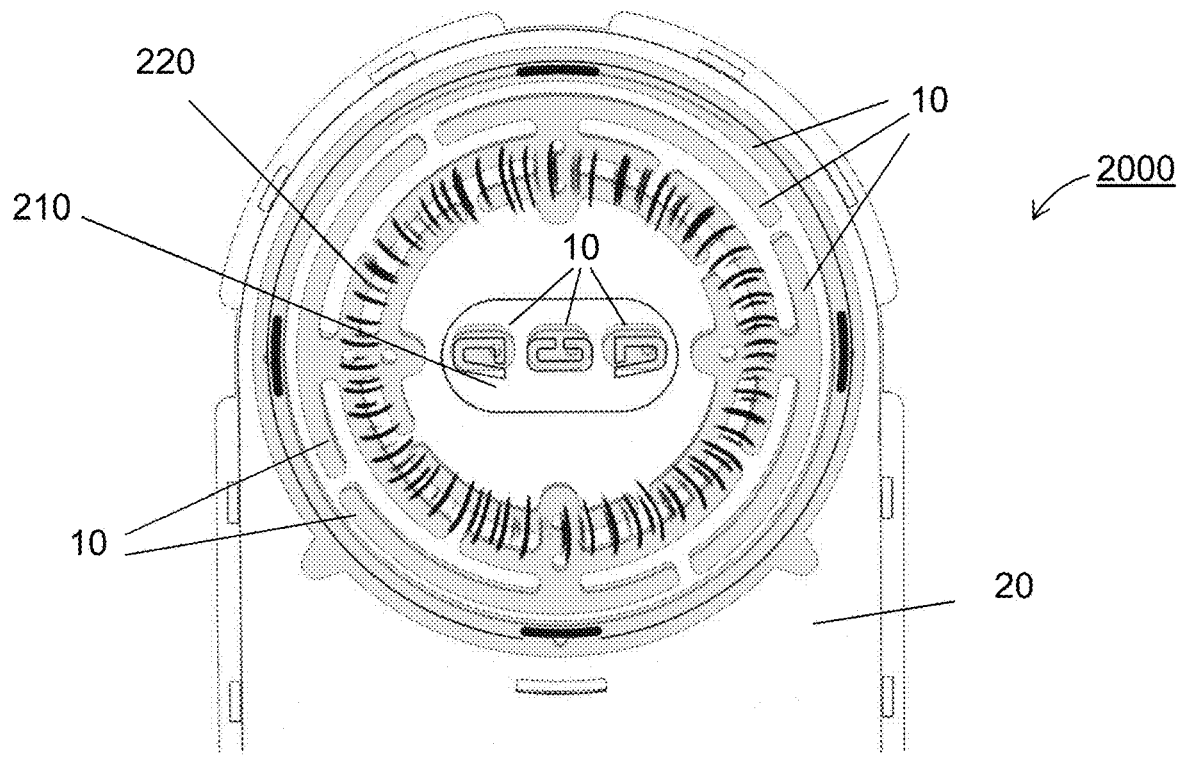
FIG. 7A shows a semi-transparent view of part of the sensor device of FIG. 6.

FIG. 7A shows a semi-transparent view of the device 2000, revealing the conductive elements 10 within the non-conductive material 20. The position of the touch switches 210 and the trackpad 220 are visible. The touch switches 210 may operate in a similar way to device 100. That is, when a user touches the surface of the non-conductive material 20 with a conductive object, the change in output signal from each conductive element 10 beneath can be detected, and used to generate a control signal.

Figure 7B:
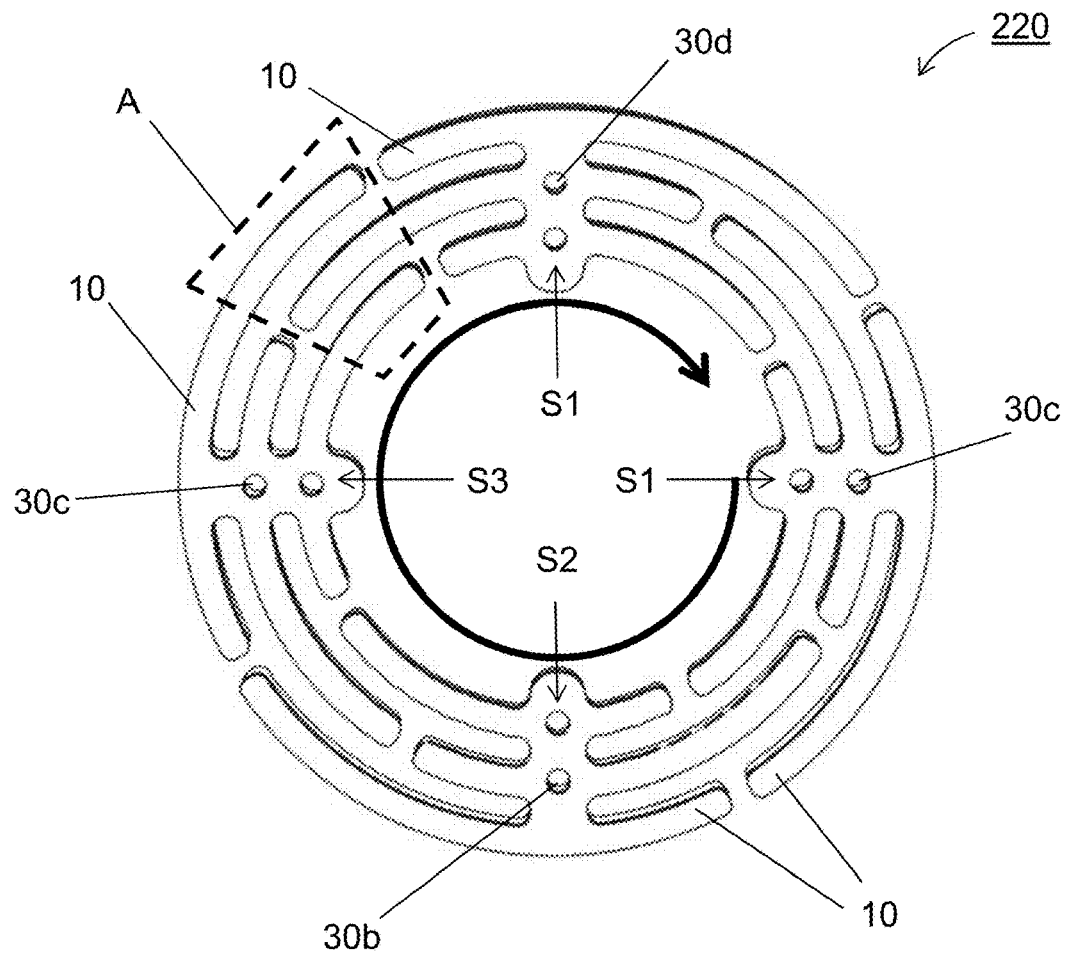

FIG. 7B shows the conductive elements or portions 10 that form part of the trackpad 220 (the conductive material 20 on top is omitted for clarity). As shown, the trackpad 220 comprises four discrete conductive elements that form four sensor electrodes S1, S2, S3, S4. Each electrode S1, S2, S3, S4 comprises at least one respective wiring/measuring point 30a, 30b, 30c, 30d for connecting to a measurement apparatus 50 (not shown).

Device 2000 operates in a similar way to device 200. In use, when a user touches the trackpad 220 with a conductive object 40 (e.g. finger) and moves it around the trackpad 220, the position of the conductive object 40 with respect to each wiring point 30a, 30b, 30c, 30d changes. Due to the design of the sensor electrodes S1, S2, S3, S4, as the conductive object 40 moves it the trackpad 220, e.g. in the direction indicated by the bold arrow, the overlap area between the conductive object 40 and the conductive material 10 of each sensor electrode S1, S2, S3, S4 changes, causing a corresponding change in the output signal from each sensor electrode S1, S2, S3, S4. This change may be substantially smooth. The measurement apparatus 50 may be configured to interpret the output signals to determine the positon, speed and direction of movement of the conductive object 40. Although separate conductive elements/electrodes are shown in FIG. 7B, in other embodiments, a unitary electrode with multiple conductive elements or portions may be used and operate in a similar way, e.g. see trackpad 520 of FIG. 11B.

Figure 7C:
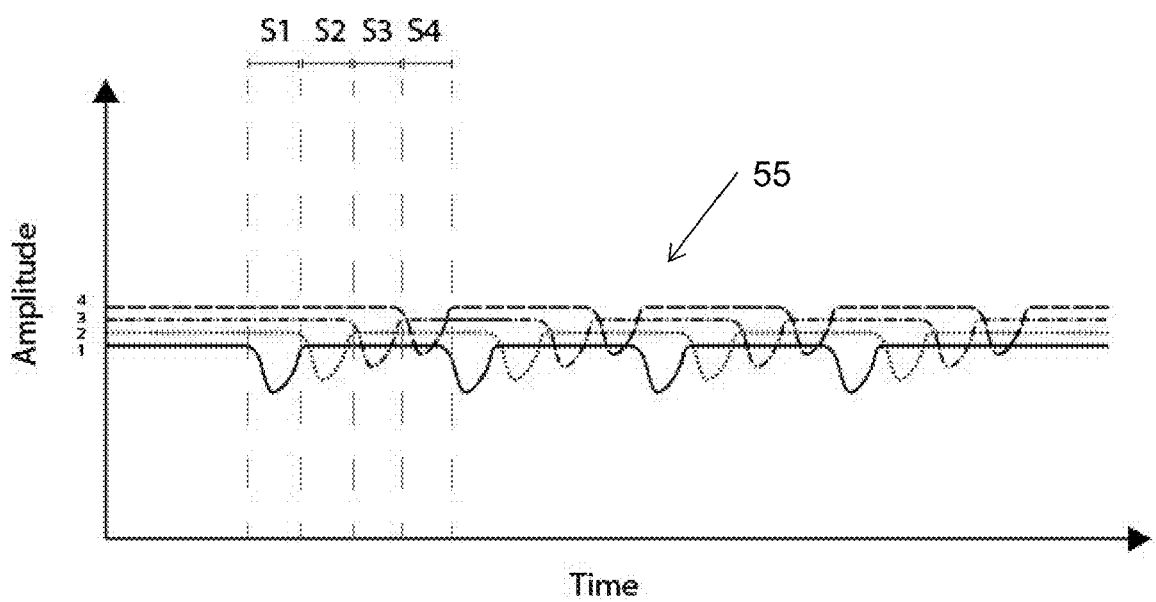

FIG. 7C shows an example of the output signal behavior versus time that may be observed from the sensor electrodes S1, S2, S3, S4 arrangement of FIG. 7B when a conductive object 40 is moved across the surface of the non-conductive material of the trackpad 220 in a clockwise circular direction (as indicated by the bold arrow in FIG. 7B) and at a constant speed. The output signal from each separate electrode S1, S2, S3, S4 is indicated and changes smoothly in a continuous analogue manner. A maximum amplitude or change in the output signal 55 is observed when the conductive object 40 is positioned directly over or close to the respective wiring point 30a, 30b, 30c, 30d of each sensor electrode S1, S2, S3, S4. As the conductive object 40 moves away from the respective wiring point 30a, 30b, 30c, 30d of each sensor electrode S1, S2, S3, S4, the output signal amplitude reduces.

It will be understood that the precise form of the time varying output signal 55 from each sensor electrode S1, S2, S3, S4 will depend on the speed at which the conductive object 40 is moved. However, for a constant speed movement, the output signal from each sensor electrode S1, S2, S3, S4 may be substantially symmetric in time, or asymmetric in time, depending on the design of the sensor electrode S1, S2, S3, S4. In FIG. 7B the sensor electrode S1, S2, S3, S4 have an asymmetric design leading to an asymmetric output signal with time. In this case, each sensor electrode S1, S2, S3, S4 has a plurality of finger-like projections extending away from the wiring point 30a, 30b, 30c, 30d. The finger-like projections of each pair of adjacent sensor electrodes S1, S2, S3, S4 are interdigitated such that there is an overlap region (indicated by the dashed box A in FIG. 7B) where the conductive object 40 can interact with conductive material 10 from both adjacent sensor electrodes S1, S2, S3, S4 at the same time. This allows the measurement apparatus 50 to determine the positon, speed and direction of movement of the conductive object 40 at any point around trackpad 220. As shown in FIG. 7B, the arrangement of finger projections either side of a wiring point 30a, 30b, 30c, 30d is asymmetric which leads to an asymmetric output signal with time. This may further aid the determination of speed and direction of movement of the conductive object 40.

Although finger-like projections are shown in the example of FIG. 7B, it will be appreciated that the above described detection principle may be achieved using a number of different designs of the sensor electrodes S1, S2, S3, S4. Further, it will be appreciated although four sensor electrodes S1, S2, S3, S4 are shown in FIG. 7B, in general, two or more sensor electrodes may be used.

Figure 8A:
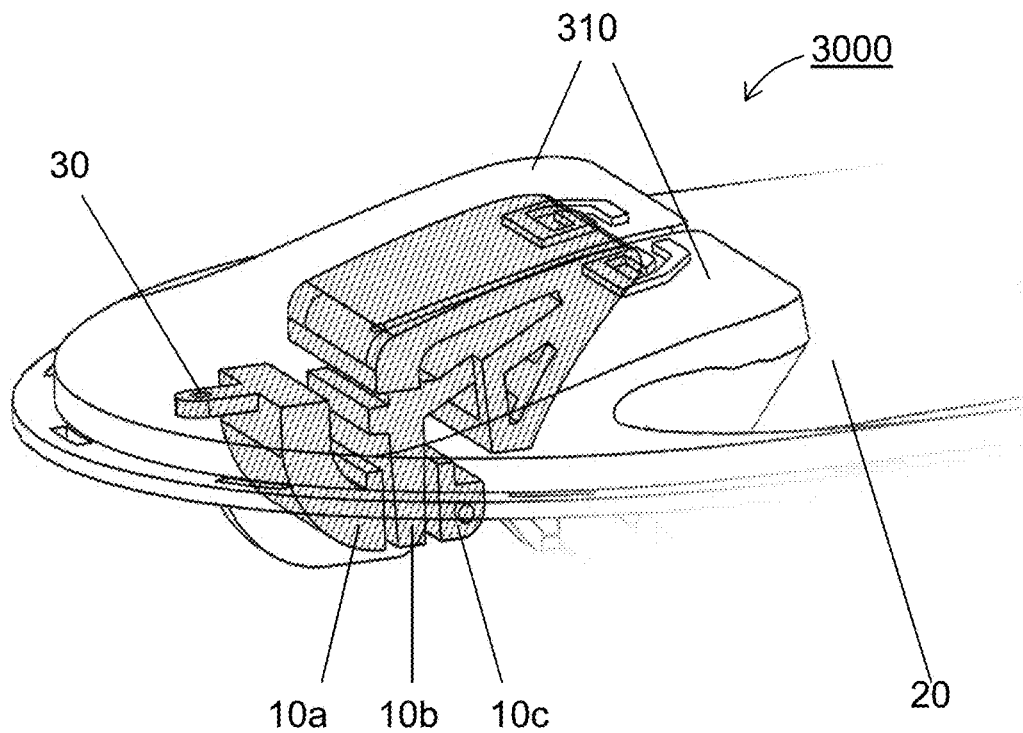
FIG. 8A shows a semi-transparent view of another part of the sensor device of FIG. 6.

FIG. 8A shows an enlarged semi-transparent view of device 3000, revealing the conductive elements 10a, 10b, 10c within the non-conductive material 20 for one of the push/pull buttons. The conductive elements 10a, 10b, 10c form three sensor electrodes S1, S2, S3 arranged with a gap g1 and g2 between adjacent conductive elements, as shown more clearly in FIG. 8B. Each sensor electrode S1, S2, S3 has one or more wiring points 30. The device 3000 comprises a protrusion 310 (in this case, in the form of a push/pull button) formed by the non-conductive material 20 with the central conductive element 10b (sensor electrode S2) extending into the protrusion 310. In this example, the non-conductive material 20 is flexible and deformable (e.g. formed of or comprising TPE), and the conductive material 10 is comparatively rigid (e.g. formed of or comprising ABS or TPE). In particular, in this example, the 3D shape of the conductive element 10b that extends into the protrusion 310 is designed to flex and deform by integrating portions of varying thickness, hollows 320 and overhanging structures 330.

Device 3000 operates in a similar way to device 300. In use, when a user interacts with the pull/push button causing the protrusion 310 and the interior conductive element 10b to move (e.g. in either direction shown in FIG. 8B), the non-conductive material 20 between the gaps g1, g2 deforms. This changes the gap g1 and/or g2 between the adjacent sensor electrodes S1, S2, S3 causing a measurable change in the output signals. The conductive element 10b extending into the protrusion 310 may be grounded during use to minimise minimize any influence a user's finger may have on the capacitance between the two gaps g1, g2.

Figure 8B:
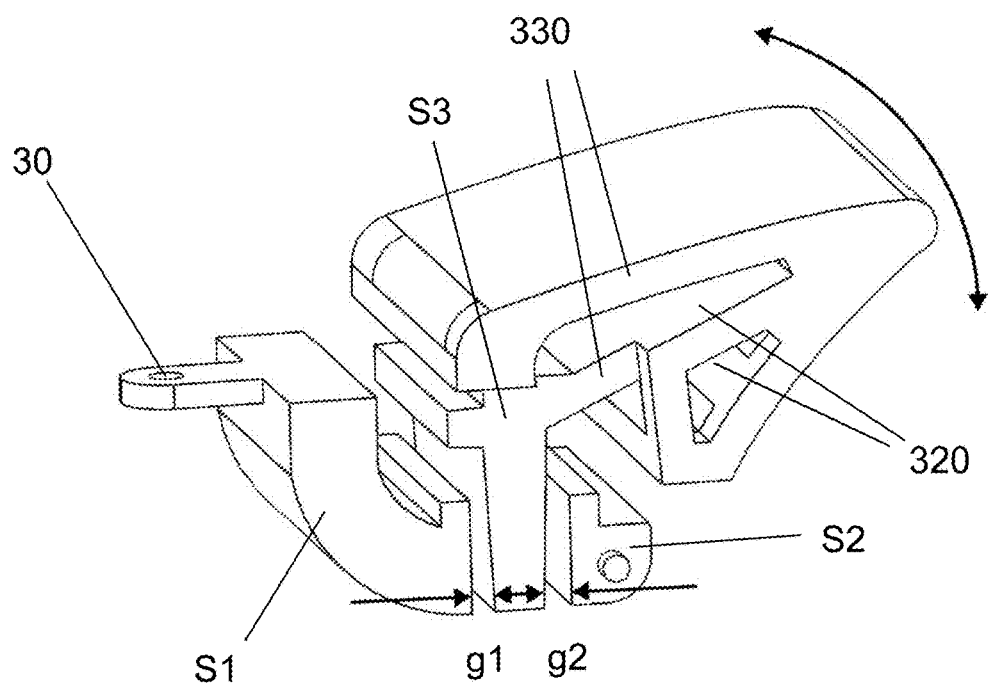
Figure 8C:
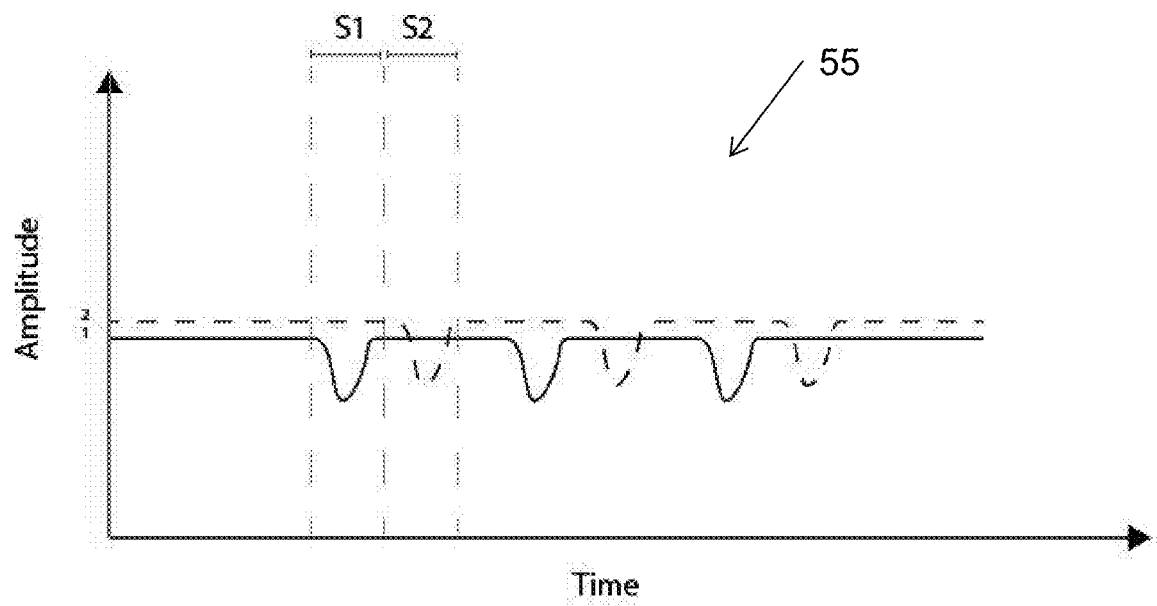

FIG. 8C shows an example of the output signal behavior versus time that may be observed from the sensor electrode S1, S2, S3 arrangement of FIG. 8B when a user pushes or pulls the button. The output signal from electrodes S1 and S2 is indicated and changes smoothly in a continuous analogue manner, similar to device 2000.

In use, when a user interacts with device 2000 and/or 3000, the measurement apparatus 50 may be configured to perform signal processing algorithms to determine touch location, movement speed and/or touch gestures.

Advantageously, the devices 100, 200, 2000, 3000 described above may further include additional user feedback elements. The user feedback may be tactile/haptic, visual, and/or audio to provide a physical, visual, and/or audio stimulus to the user in response to a user touch or interaction with a device 100, 200, 2000, 3000 being detected. The additional user feedback elements may be integrated within the non-conductive material 10, e.g. during the moulding process.

In one example, the device 100, 200, 2000, 3000 may further comprise one or more light emitting devices (e.g. LEDs) that are activated in response to a user touching or interacting with the device. With reference to FIG. 6, for example, when a user touches one of the touch switches 210, e.g. to select a mirror to adjust, an LED may activate to give a visual indicator of which button/switch/mirror has been selected.

The tactile feedback element may be or comprise a haptic feedback component. The haptic feedback component may be any haptic technology. For example, the haptic feedback component may be or comprise an oscillator, vibrator, motor, coin motor, piezo module, eccentric rotating mass (ERM) motor and/or linear resonant actuator (LRA). The haptic feedback element may provide a physical stimulus to the user in response to predefined interaction being detected, e.g. touching a button 210 or moving a push/pull button 3000.

Figure 9:
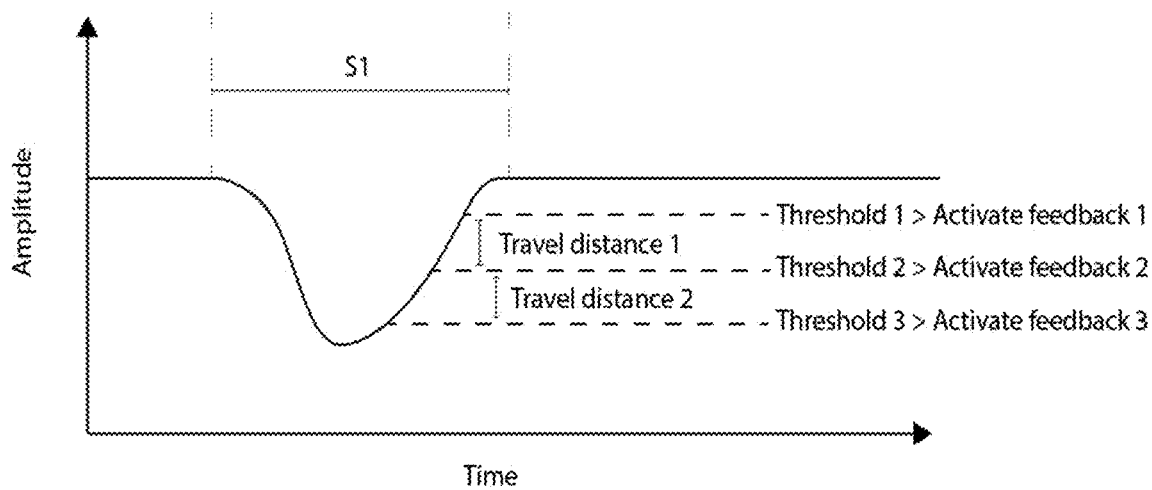

Alternatively or additionally, the intensity of the user feedback (haptic, visual, audio and/or otherwise) may be progressive or modulated in accordance with the size of the relevant output signal detected. An example of how a progressive/modulated feedback may be implemented for the device 3000 is illustrated in FIG. 9, which shows the output signal from sensor electrode S1 versus time. When a user presses down (or lifts up) the button 310 causing deformation of the non-conductive material 20 in the gaps g1, g2, a continuous output signal (pressure signal) is produced with a varying amplitude. By defining various threshold values for the output signal, e.g. that are proportional to the force applied by the user or the distance travelled by the electrodes S1, S2, S3, each threshold may be used to activate a user feedback effect of varying type and/or intensity. In the case of haptic feedback, this approach may allow the device 3000 to mimic the modulated touch feedback that may normally be felt in a mechanical press button. For example, the haptic feedback of device 3000 may provide "click" according to the user finger travel distance. Thus, the device 3000 may be perceived to behave mechanically, without the need for mechanical part assemblies, thereby reducing production costs. User feedback (haptic, visual, audio and/or otherwise) may be implemented in a similar way for any of the devices 100, 200, 2000, 3000 described.

Figure 10A:
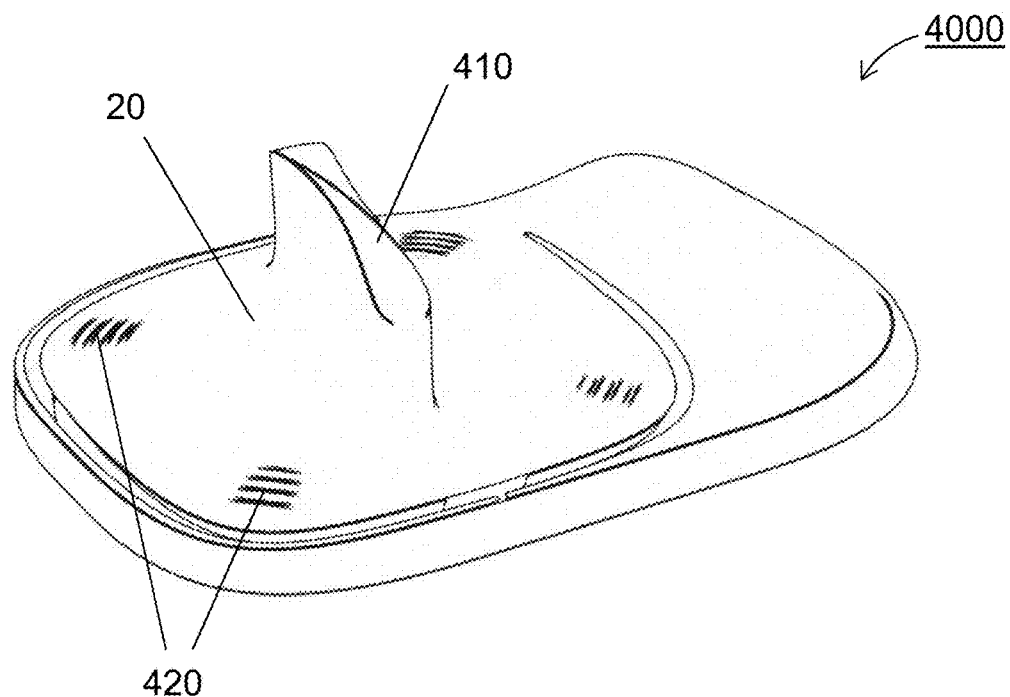
FIG. 10A shows another sensor device.

FIG. 10A shows an example of a device 4000 comprising a twist or projection handle 410. The twist handle 410 may be used, for example, to control seating and/or lighting within an automobile interior. As shown, the device 4000 is covered with non-conductive material 20. The device 4000 may further comprise one or more touch buttons and/or trackpads 420. The touch buttons and/or trackpads 420 may be used, for example, to select a seat or light to control. The non-conductive material 20 may comprise a textured surface above the trackpad 420 to mark or indicate the trackpad 420 to the user, aid in determining the position of the user's finger and/or provide tactile feedback to the user. As described with reference to the previous examples, additional user feedback elements may be integrated in the device 4000 (e.g. in the non-conductive material 20).

Figure 10B:
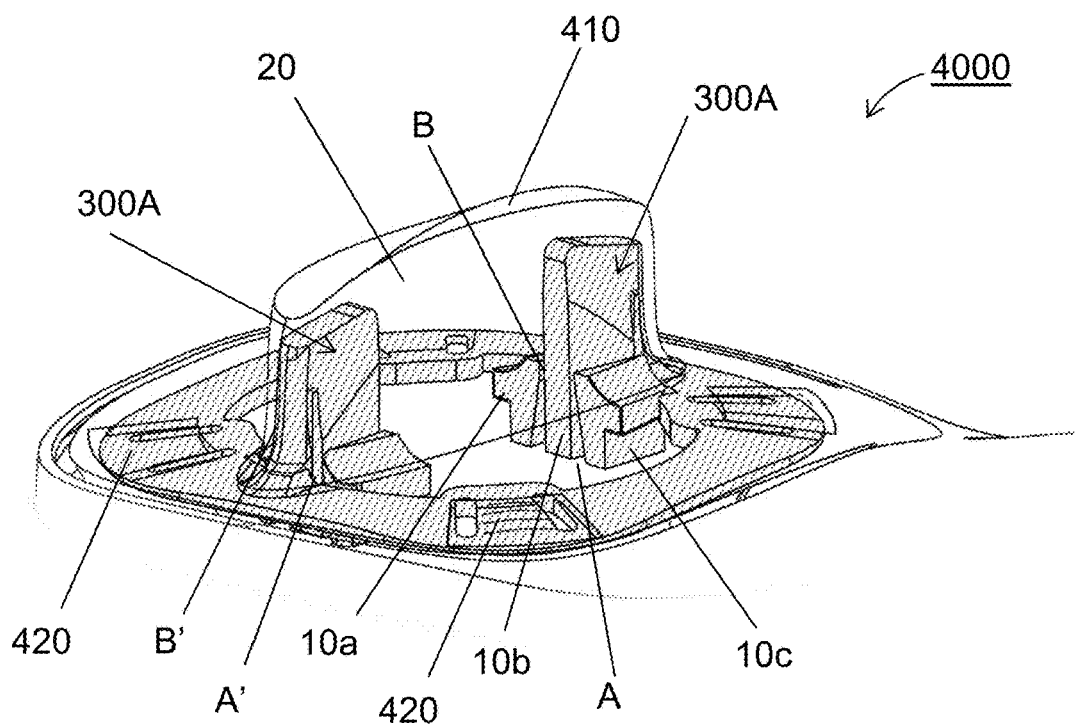
Figure 10C:
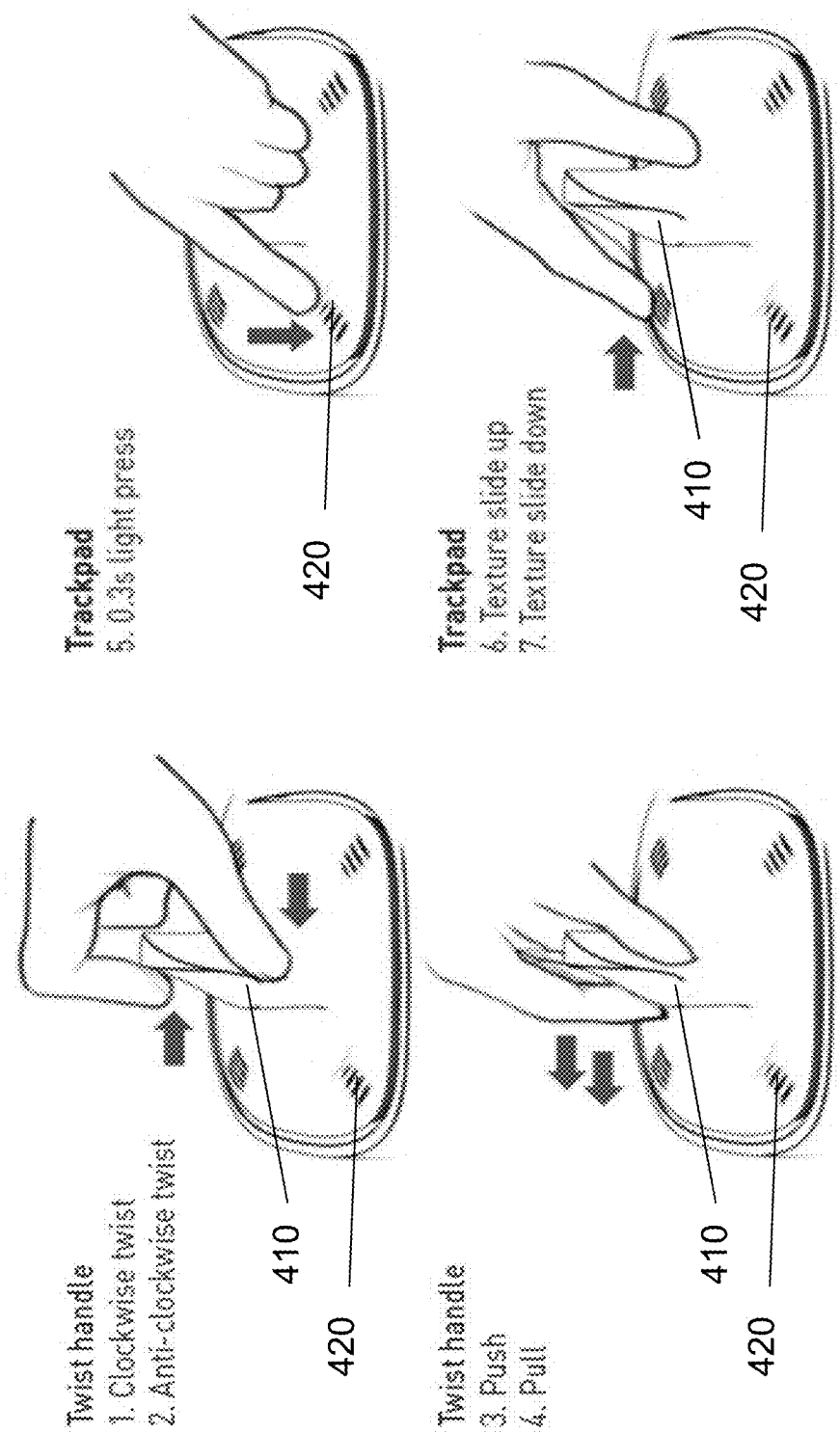

The user interactions supported by the device 4000 are indicated in FIG. 10C. As shown, the twist handle 410 may be operable to detect rotation of the twist handle 410 as well as a linear tilt (push/pull) of the handle 410. FIG. 10B shows a semi-transparent view of device 4000, revealing the conductive elements 10 within the non-conductive material 20. To provide the twist handle's functionality, the twist handle 410 comprises a pair of devices 300A, which operate in a similar way to devices 300 and 3000 of FIGS. 5 and 8. Each device 300A comprises three conductive elements 10a, 10b, 10c arranged with a gap g1 and g2 between adjacent conductive elements. As with devices 300 and 3000, device 300A is configured to produce a change in the output signal from the conductive elements 10a, 10b, 10c when the non-conductive material 20 within the gaps g1 and/or g2 is deformed by the user moving the twist handle 410. The gaps g1 and g2 used for detecting movement with the device 300A may be located at locations A and/or B (and corresponding position A' and/or B' on the other device 300A) shown on FIG. 10B. This configuration can effectively detect the user bending the projection handle 410 to either side, and twisting the projection handle 410 clockwise or anti-clockwise. Specifically, when the user pushes/pulls the handle 410 towards one side, the gap g1 at both positions A and A' (and/or B and B') decreases/increases (in the same sense) at the same time. When the user twists the projection handle 410 in one direction (clockwise/anti-clockwise), the gap g1 at position A (and/or B) on one device 300A decreases/increases while the gap g1 at position A' (and/or B') on the other device 300A increases/decreases (i.e. in the opposite sense) at the same time.

As described with reference to devices 300 and 3000, each device 300A produces output signals that enable the force/tilt direction to be determined. The provision of two devices 300A means that when a user twists or pushes/pulls the handle 410, each device 300A will be deflected in opposite or the same directions, respectively, allowing the two types of movement to be distinguished.

In the example of FIG. 10, the non-conductive material 20 is substantially soft, flexible and deformable (e.g. formed of or comprising TPE or silicone rubber). The conductive material 10 may be substantially rigid in comparison (e.g. formed of or comprising ABS, TPE). Alternatively, the conductive material 10 may also be flexible and deformable (e.g. formed of or comprising silicone rubber, TPU or TPE).

Figure 11A:
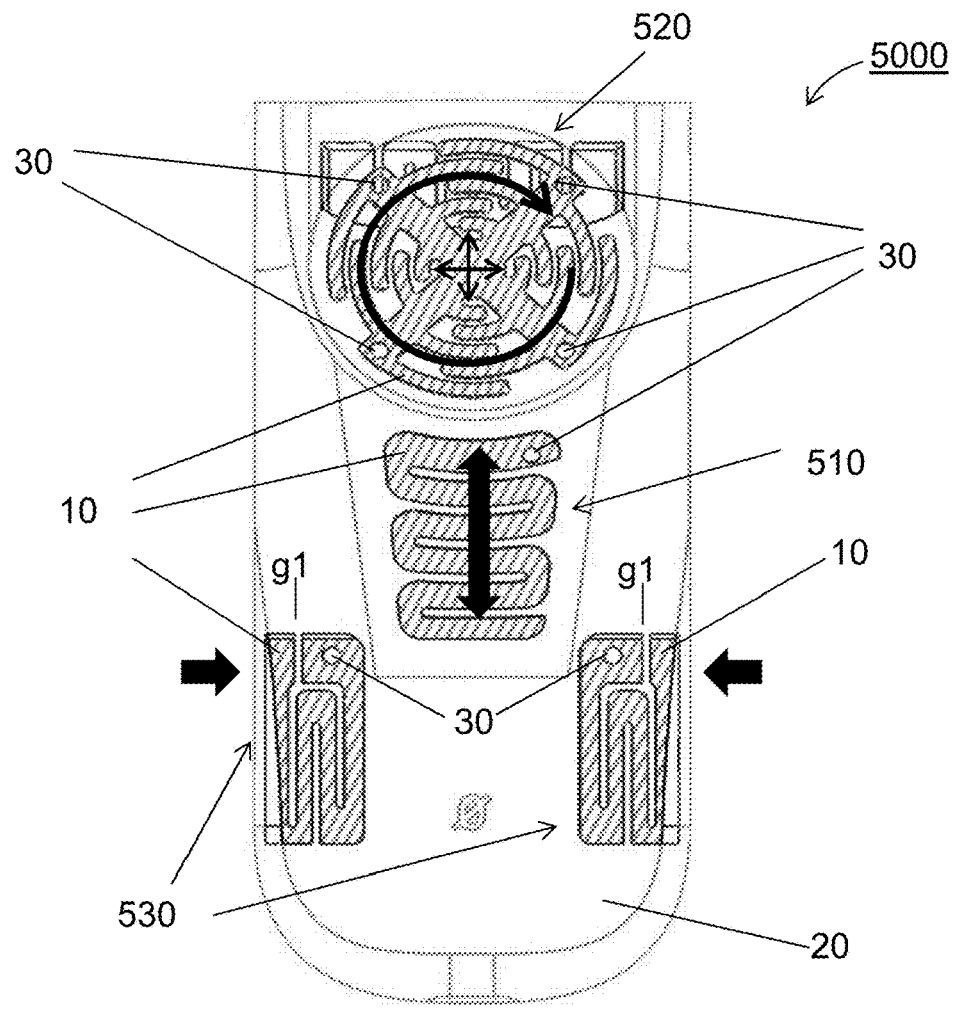
FIG. 11A shows a semi-transparent view of a handheld sensor device.
Figure 11B:
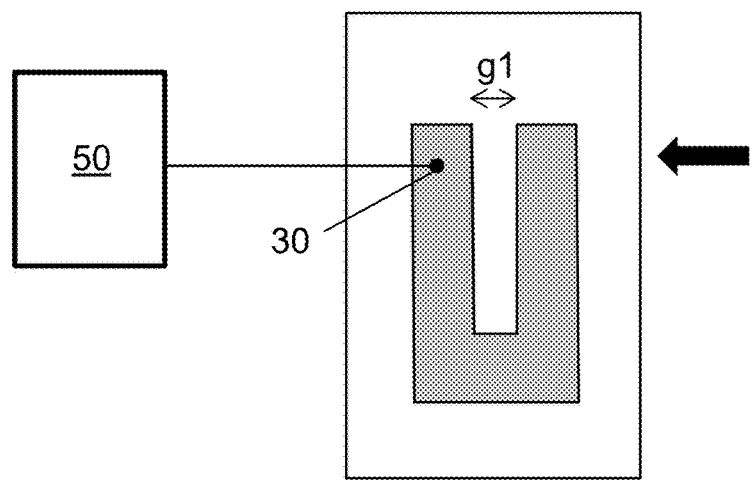

FIG. 11A shows a semi-transparent view of another example device 5000, showing the conductive elements 10 formed within the non-conductive material 20. Each conductive element 10 has one or more wiring points 30 as shown. Each wiring point 30 may be connectable to a measurement apparatus 50 (not shown). The device 5000 may be a handheld controller comprising one or more devices 510, 520, 530 suitable for providing control signals in response to a plurality of user hand and/or finger gestures. The device 5000 may, for example, be suitable for virtual reality (VR) control applications.

The device 5000 may comprise a linear trackpad 510. The trackpad 510 may operate in a similar way to device 100 and provide an output signal in response to a user touching, moving or pressing their finger (or conductive object) on or across the surface of the non-conductive material 20, e.g. in the direction indicated by the bold arrow. The output signal may be used to determine the position, speed and/or direction of movement of the user's finger. In the example shown, the trackpad 510 comprises a single conductive element 10. The shape of the conductive element 10 may be designed according to the application, e.g. to define a particular resistance between a specific touch travel distance of the conductive element 10 and/or size of the trackpad active sensing area. The conductive element 10 forms a single electrode. However, the electrode may comprise a plurality of electrode portions, for example, each portion corresponding to a different location on the electrode. The conductive element 10 of the trackpad 510 may be or comprise a substantially curved, S-shaped or serpentine shaped track as shown. In this example, each section of the S-shaped track may be or comprise an electrode portion. Alternatively, the conductive element 10 of the trackpad 510 may be or comprise a substantially linear/rectangular track (not shown).

Advantageously, by having an S-shaped track 510, the resistance between two given touch positions (e.g. for a finger moving in the direction shown in FIG. 11A) can be controlled, and is larger than it would be on a substantially linear track. Specifically, the resistance of the conductive track is given by $R=\rho*L/A$, where $\rho$ is the material resistivity (which is fixed), L is the length and A is cross-sectional area. By having an S-shaped track, the overall (i.e. unraveled) length L is increased and the cross-sectional area A is decreased, thereby increasing the resistance between any two fixed points. When the user touches or presses the track 510, the change in output signal between two given touch points, or for a specific touch travel distance, is therefore enlarged. This achieves higher spatial resolution of touch location sensing.

The device 5000 may further comprise a trackpad wheel 520. The trackpad wheel 520 may operate in a similar way to trackpad wheel 220 and provide output signals in response to a user touching, moving or pressing their finger (or conductive object) on or across the surface of the non-conductive material 20, e.g. in any of the directions indicated by the bold arrows. The design of the conductive element 10 allows touch position, linear and circular movements to be determined across the entire area of the trackpad wheel 520. The output signal provided by each wiring point 30 may indicate a position of the user's finger relative to the respective wiring point 30. The measurement apparatus (not shown) may be configured to interpret and combine the output signals from each wiring point 30 to determine the position, direction and/or movement of the user's finger on the trackpad wheel 520. The trackpad wheel 520 is a single unitary conductive element 10 with multiple wiring points 30. The conductive element 10 is an electrode comprising a plurality of electrode portions (e.g. each arm of the trackpad wheel may be an electrode portion). Although four wiring points 30 are shown in FIG. 11A, the trackpad wheel 520 may comprise two or more wiring points 30. Further, although shown in FIG. 11A as comprising a single unitary conductive element 10 with multiple wiring points 30, in other examples (not shown) the trackpad wheel 520 may comprise multiple separate conductive elements or portions 10, e.g. arranged in a similar way to that shown in FIG. 7B.

The device 5000 may further comprise one or more push buttons 530. The or each push button 530 may operate in a similar way to device 300 and 3000 to provide an output signal in response to deformation of the non-conductive material 20 within a gap g1 (see also FIG. 11B) between portions of the conductive element 10. In contrast to devices 300, 3000, the gap g1 of the push button 530 is formed between portions of the same conductive element 10, as is illustrated more clearly in FIG. 11B. In use, a user applying a force or pressure to the non-conductive material 20, e.g. in the direction indicated by the bold arrow in FIG. 11B, causes the non-conductive material 20 to deform and change the gap g1. This causes a change in the capacitance which can be detected in the output signal by the measurement apparatus 50. As with devices 300 and 3000, push button 530 may provide a change in the output signal regardless of whether the object applying the pressure/force is conductive or non-conductive.

Figure 12A:
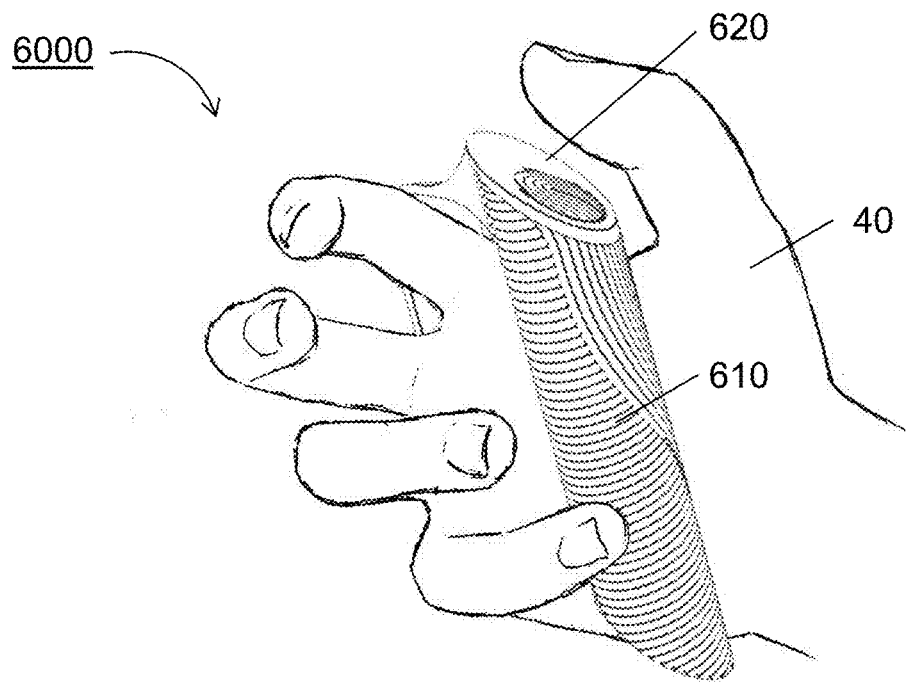
FIGS. 12A, 12B, 13A and 13B show further examples of handheld sensor devices.
Figure 12B:
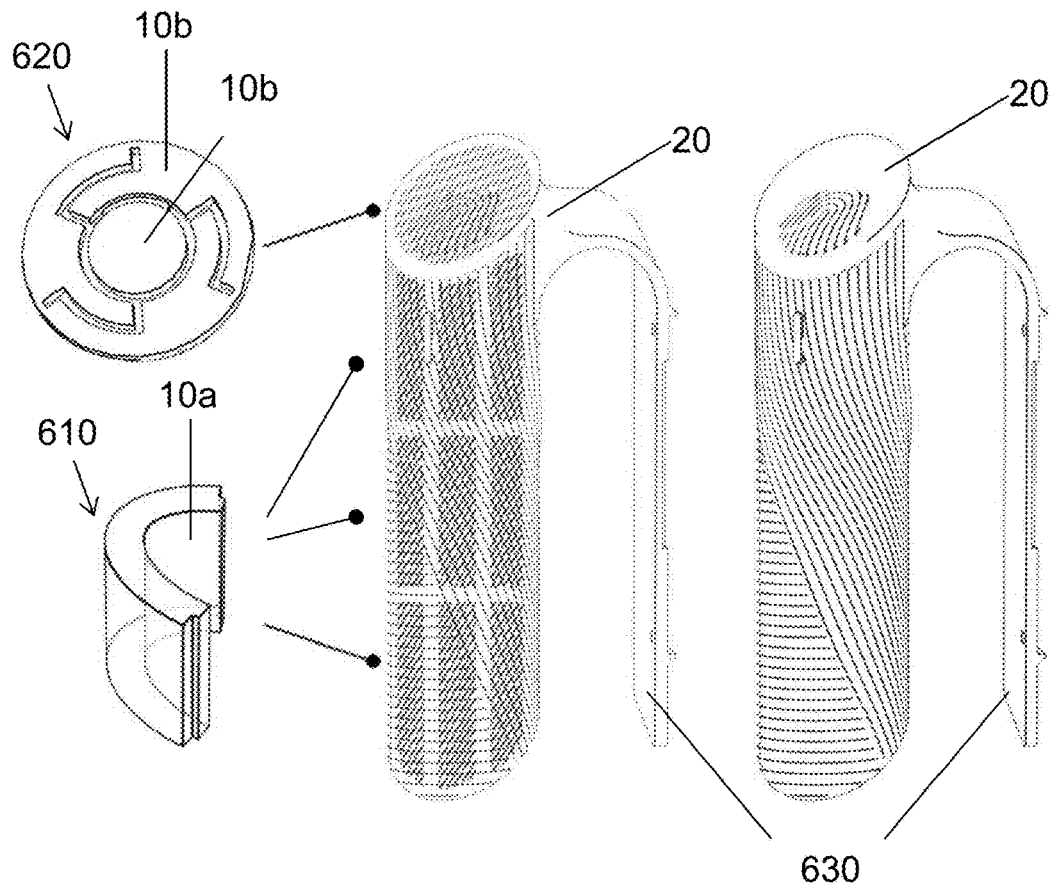

FIGS. 12A and 12B show a further example of a handheld control device 6000 incorporating one or more conductive elements 10 as sensing electrodes covered in non-conductive material 20. The device 6000 may be shaped to be gripped by the user's hand and comprise one or more devices 610, 620 configured and arranged to detect separate touch interactions from a user's fingers and/or thumb. For example, the device 6000 may comprise one or more finger touch devices 610. The finger touch devices 610 may be arranged in a handle portion of the device 6000, as shown in FIG. 12B. The or each finger touch device 610 may comprise a conductive element 10a beneath the non-conductive material exterior 20 and may operate in a similar way to device 100 or 200. The device 6000 may further comprise one or more thumb touch devices 620. The or each thumb touch device 620 may comprise one or more conductive elements 10b beneath the non-conductive material exterior 20 and operate in a similar way to device 100 or 200. The or each conductive element 10a and 10b of devices 610 and 620 may comprise one or more wiring points (not shown) to provide one or more output signals. The non-conductive material 20 may be or comprise a textured or 3D profiled surface, e.g. as shown in FIGS. 12A and 12B.

Figure 13A:
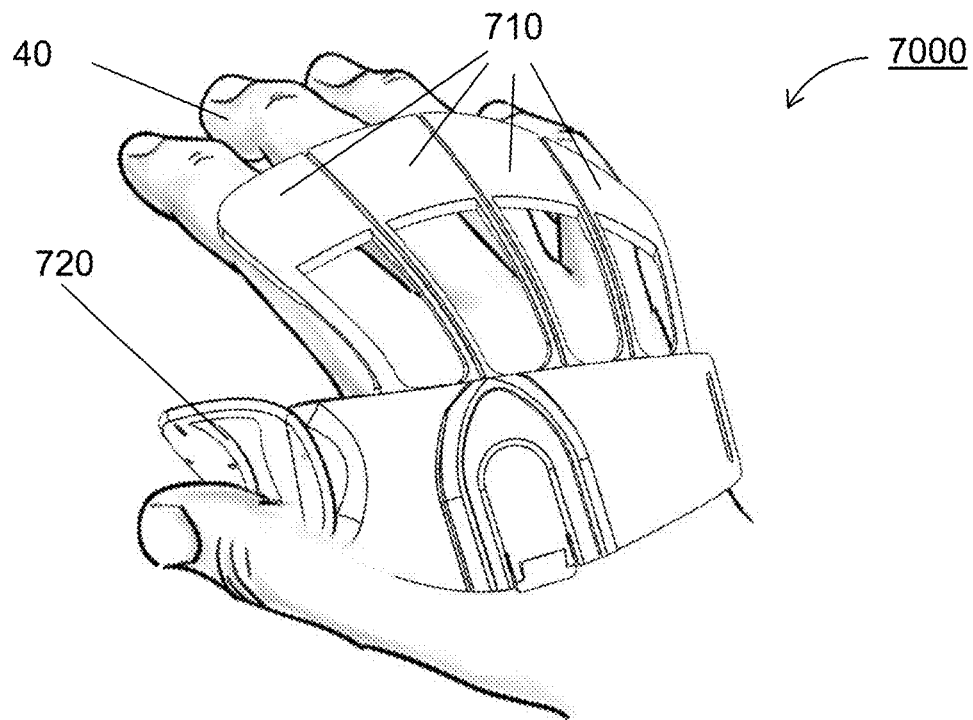
Figure 13B:
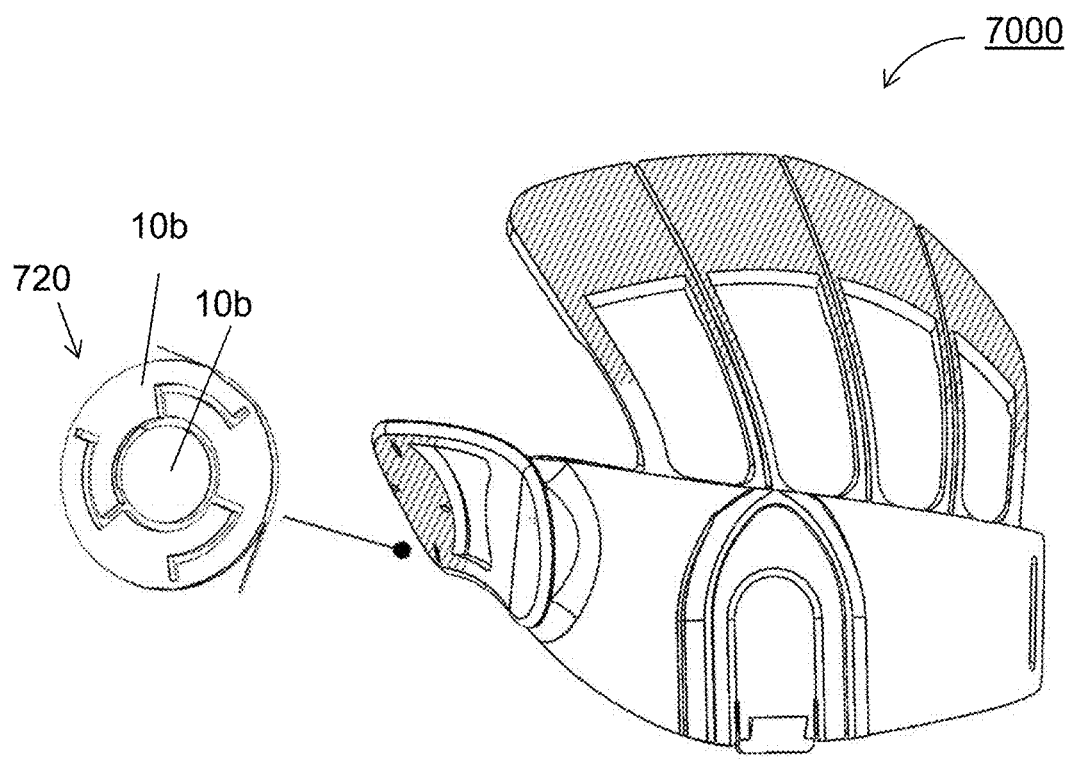

FIGS. 13A and 13B show a further example of a handheld control device 7000 incorporating one or more conductive elements 10 as sensing electrodes covered in non-conductive material 20. The device 7000 may be shaped to be worn by the user's hand and comprise one or more devices 710, 720 configured and arranged to detect separate touch and/or movement interactions from a user's fingers and/or thumb. Similar to device 6000, device 7000 may comprise one or more thumb touch devices 720, each thumb touch devices 720 having one or more conductive elements 10b with one or more wiring points.

In both handheld control devices 6000 and 7000, the sensing devices 610 and 710 are arranged on inside or outside of the user's hand, respectively. Each conductive element within device 610 and 710 is intentionally arranged in close proximity to individual fingers, so that when a finger bends or stretches, one or two conductive elements can measure the contact and/or proximity from the finger to the sensing device 610, 710. The proximity sensing function requires the sensing algorithms to be more sensitive and detect smaller changes caused by the conductive object 40 moving close to the sensing device 610, 710 without directly contracting the surface of the non-conductive material 20.

Devices 6000 and 7000 may be suitable for providing control signals in response to a plurality of user hand and/or finger gestures. The devices 6000 and 7000 may, for example, be suitable for VR control applications.

Figure 14A:
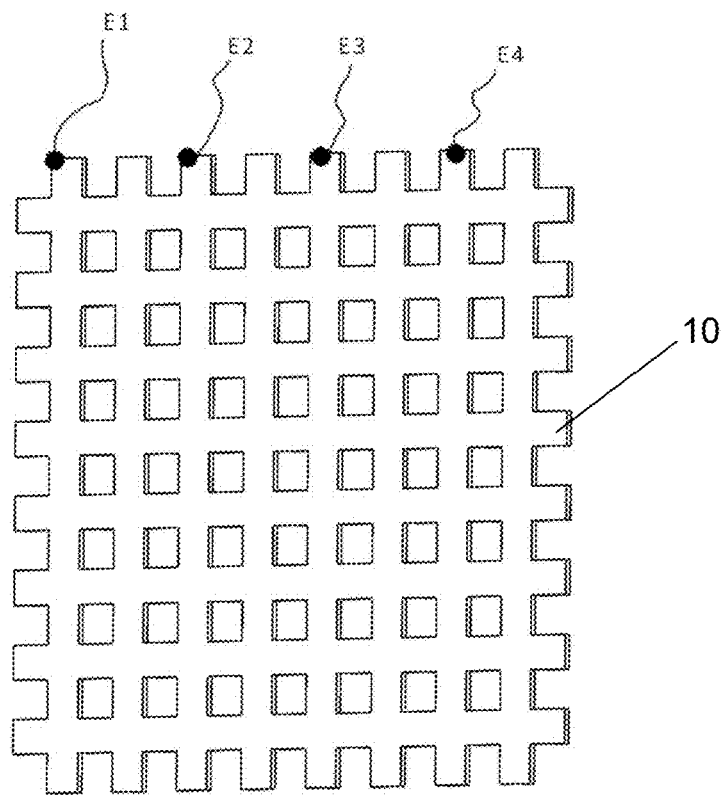
FIGS. 14A and 14B show examples of a conductive electrode.
Figure 14B:
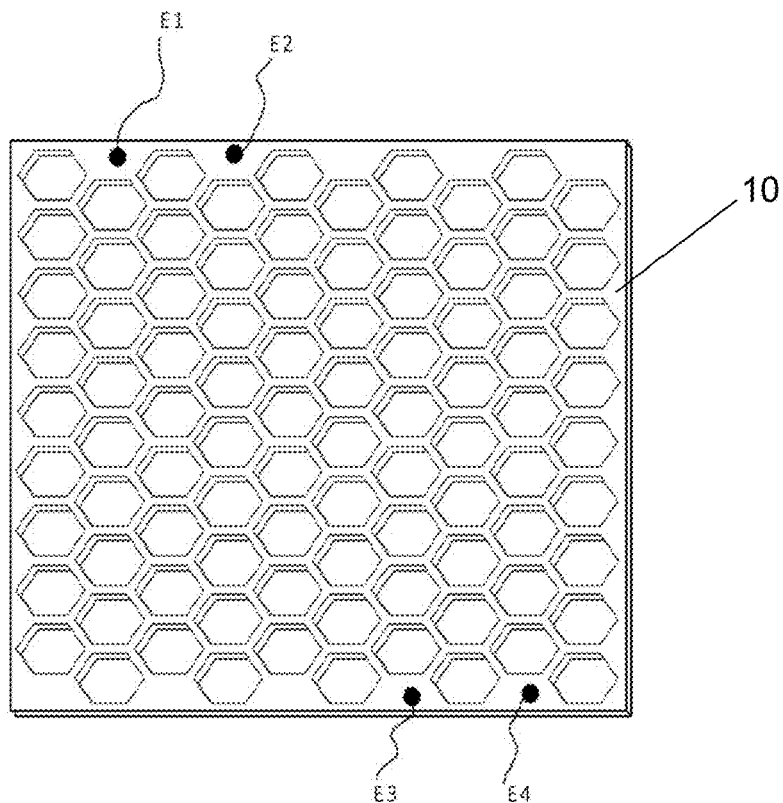

As mentioned previously, each conductive element 10 may comprise one or more wiring points to provide separate output signals that can be received, interpreted and combined by the measurement apparatus 50 to determine a touch position, speed and/or direction. FIGS. 14A and 14B show examples of a conductive element 10 with multiple wiring points, each wiring point acts as a sensing point E1, E2, E3, E4. The conductive material 10 may be formed in a specific shape to provide a specific resistance.

Similarly to the S-shaped conductive track 510 in device 5000, by providing holes, hollows, recesses, and/or repeating geometric patterns/tracks, the resistance between any two given points on a conductive element 10 can be increased without changing the resistivity of the conductive material 10. By increasing the resistance between any two given touch locations, when a conductive object 40 moves across that distance, the change in the output signal is increased. In this way, the sensitivity and spatial/location sensing resolution of the sensor device is improved.

Figure 16A:
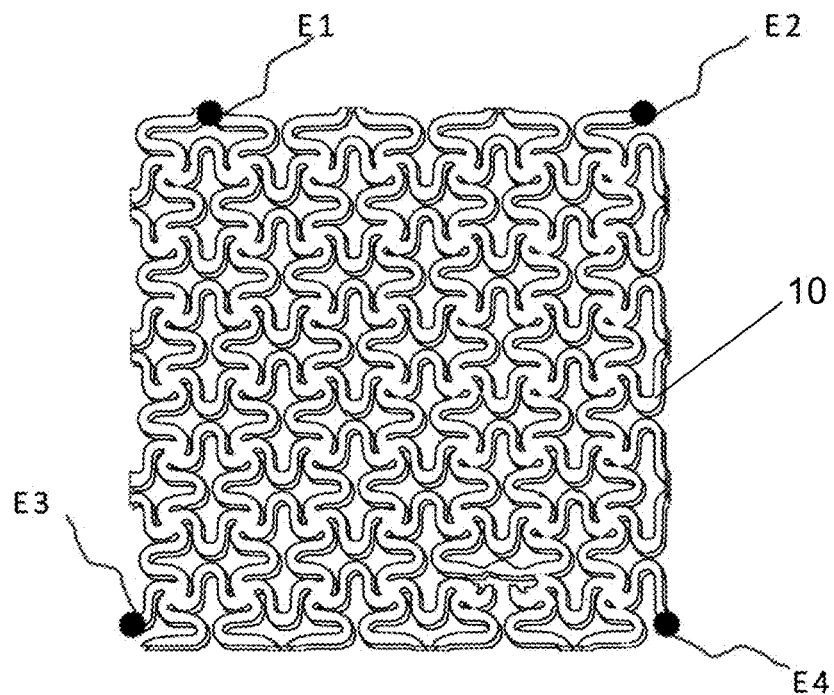
FIGS. 16A, 16B, 17 and 18 show further examples of a conductive electrode.
Figure 16B:
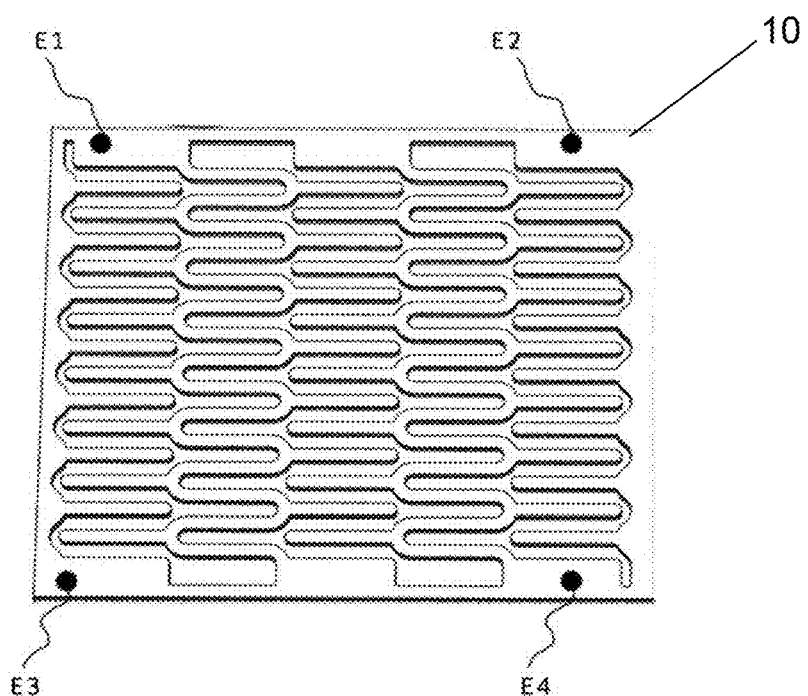
Figure 17:
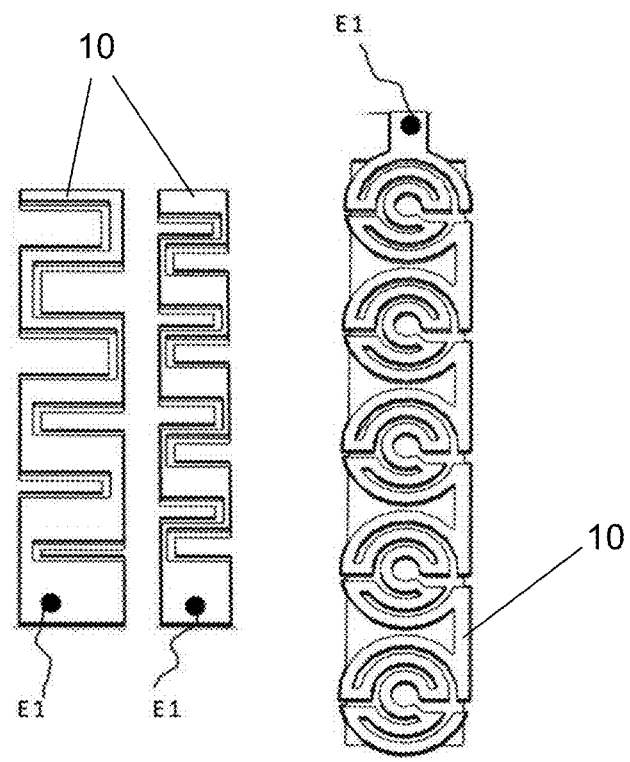

In the examples shown in FIGS. 14A and 14B, the conductive elements 10 are formed in a mesh or array type geometry. Although a substantially square and hexagonal mesh geometry is shown in FIGS. 14A and 14B, it will be appreciated that any regular repeating pattern may be implemented. Further example geometries are shown in FIGS. 16A and 16B. Further, although four wiring points are shown in FIGS. 14A, 14B. 16A and 16B, two or more wiring points may be used. FIG. 17 shows example geometries for a conductive element 10 having one wring/sensing point E1. Due to the use of regular patterns, the output signal change may be proportional to the finger travel distance.

Figure 18:
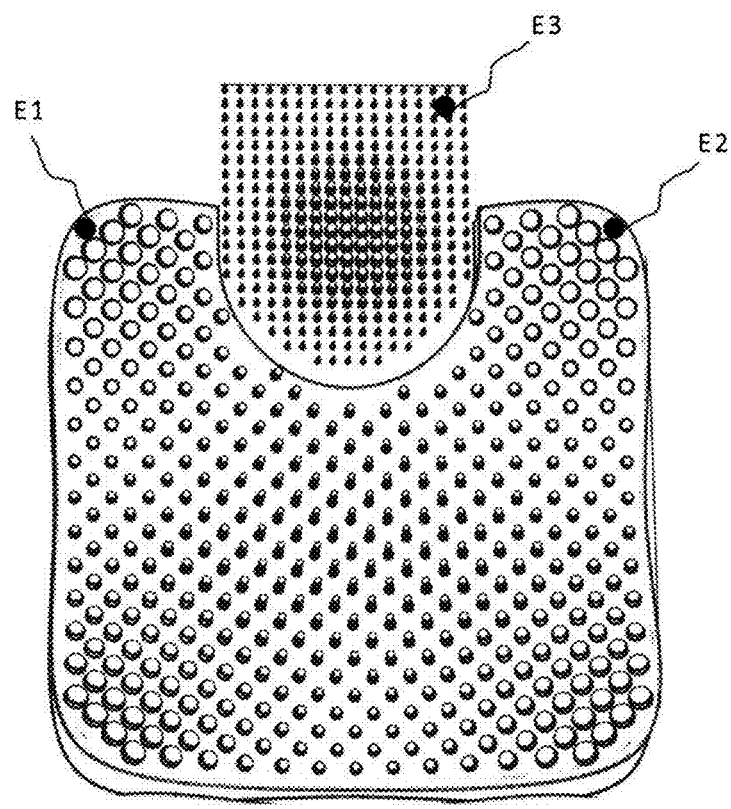
Figure 19A:
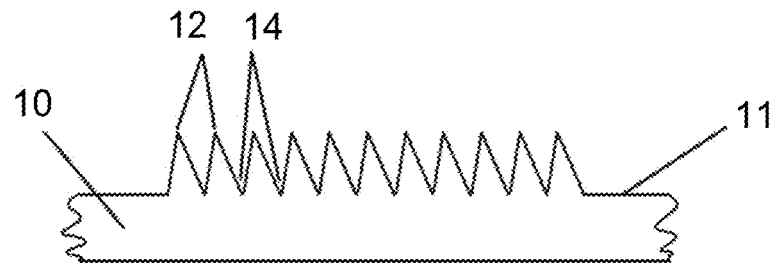
FIGS. 19A to 19G show further examples of textured surfaces.
Figure 19B:
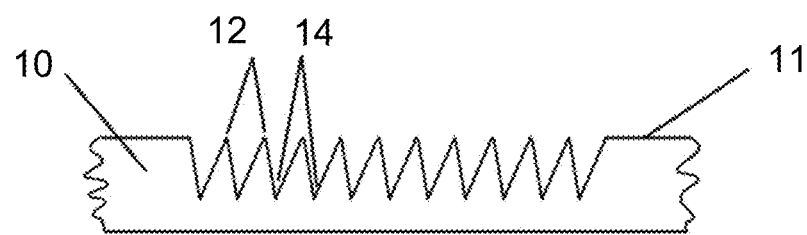
Figure 19C:
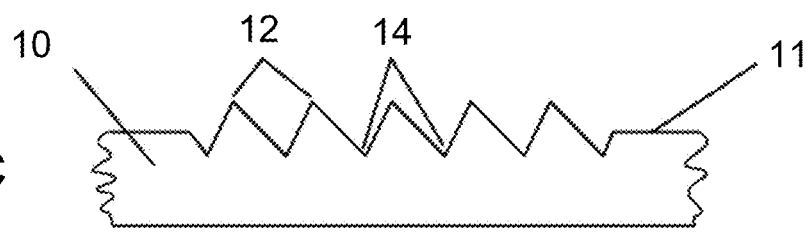
Figure 19D:
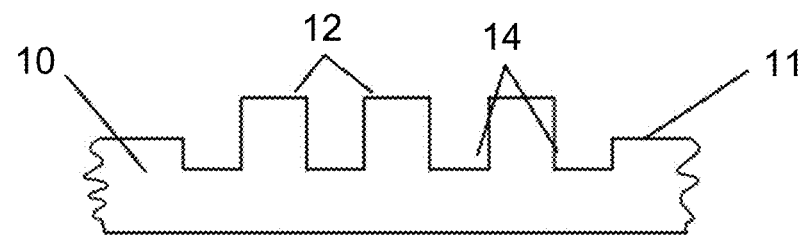
Figure 19E:
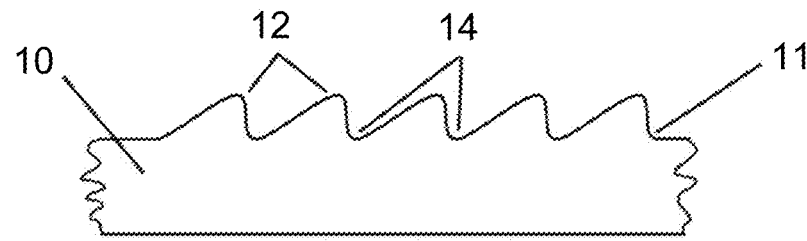
Figure 19F:
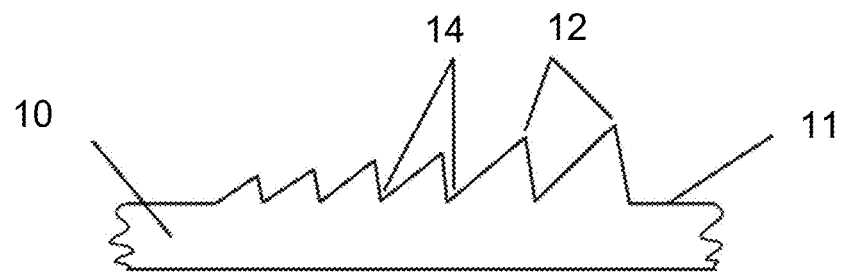
Figure 19G:
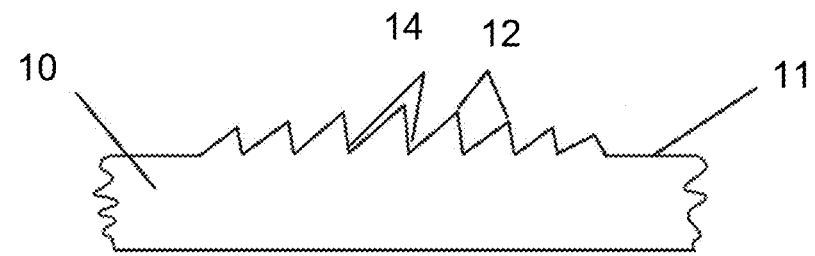

FIG. 18 shows an example geometry for a conductive element 10 having holes with different sizes instead of using repeating patterns. The irregular hole patterns can cause uneven changes in the output signal patterns, meaning the output signal change is no longer proportional to the finger travel distance. This may be advantageous in cases where a trackpad may require different sensitivity depending on where it is being touched.

FIGS. 14 to 18 disclose examples of conductive elements 10. They comprise a large quantity of complex repeating or non-repeating geometrical shapes/holes. This configuration can control the resistance between two given points on a uniform sensing material 10 with fixed resistivity, therefore achieving the desirable touch sensing resolution. The conductive element 10 embodiments are subsequently overmoulded with non-conductive material 20 forming predominantly plain surfaces used as touch sensitive trackpads. The advantage of these embodiments is that it only requires a single piece of conductive material 10 to achieve similar resolution with conventional trackpads which requires many more conductive traces/electrodes/sensors and therefore more assemblies.

The geometries shown in FIGS. 14-18 may be applied to the conductive elements or portions 10 of any trackpad embodiment.

Figure 15A:
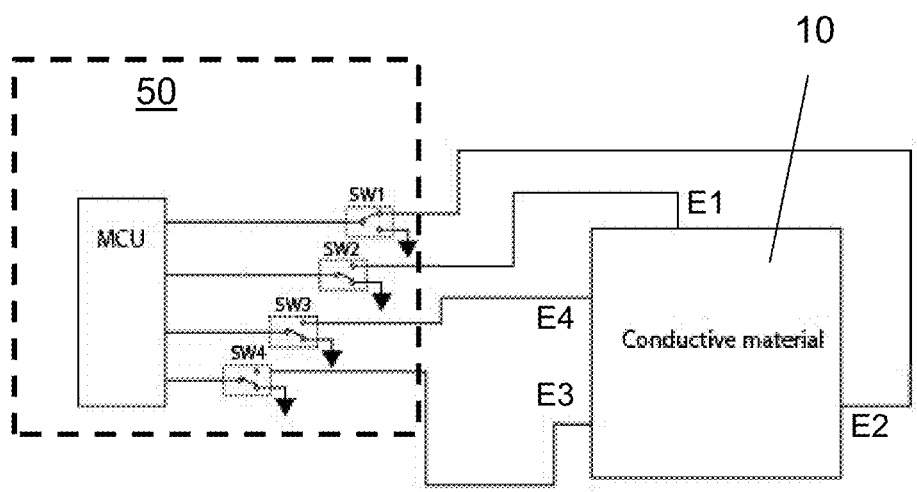
FIG. 15A shows an example multi-point measurement configuration for a conductive electrode.

Each sensing point E1, E2, E3, E4 may be connected to the measurement apparatus 50, as shown in FIG. 15A. The measurement apparatus 50 may be configured to scan through and measure the output signal from each sensing point E1, E2, E3, E4 sequentially. In this way, only one sensing point E1, E2, E3, E4 may be actively connected to the measurement apparatus 50 at a time. For example, while an output signal is being measured from one sensing point E1, E2, E3, E4, one or more of the other (non-active) sensing points E1, E2, E3, E4 may be disconnected from the measurement apparatus 50. This may be achieved via one or more switching circuits controlled by the measurement apparatus 50 or software. The switching circuits may be internal to the measurement apparatus 50 or in an external intermediate unit connected to the measurement apparatus 50 and controlled by software. In the example shown in FIG. 15A, the measurement apparatus 50 comprises a microcontroller 51 and one or more switching elements SW1, SW2, SW3, SW4. Each sensing point E1, E2, E3, E4 is connected to a respective input of the microcontroller 52 via a respective switching element SW1, SW2, SW3, SW4. The or each switching element SW1, SW2, SW3, SW4 may be controlled to switch between a first state in which the respective sensing point E1, E2, E3, E4 is connected to the microcontroller 51, and a second state in which the respective sensing point E1, E2, E3, E4 is disconnected from the microcontroller 51 and the respective microcontroller input is connected to ground. For example, the or each switching element SW1, SW2, SW3, SW4 may have one input connected to the respective microcontroller input, and two outputs, a first output connected to the conductive material 10 at the respective sensing point E1, E2, E3, E4 and a second output connected to ground. In the first state, the switch input is connected to the first output, and in the second state the switch input is connected to the second output. The or each switching element SW1, SW2, SW3, SW4 may be or comprise a general purpose transistor or other passive electronic component. Although a specific example switch configuration is shown, it will be appreciated that the above switching operation may be achieved in other ways and/or using other active or passive components.

Figure 15B:
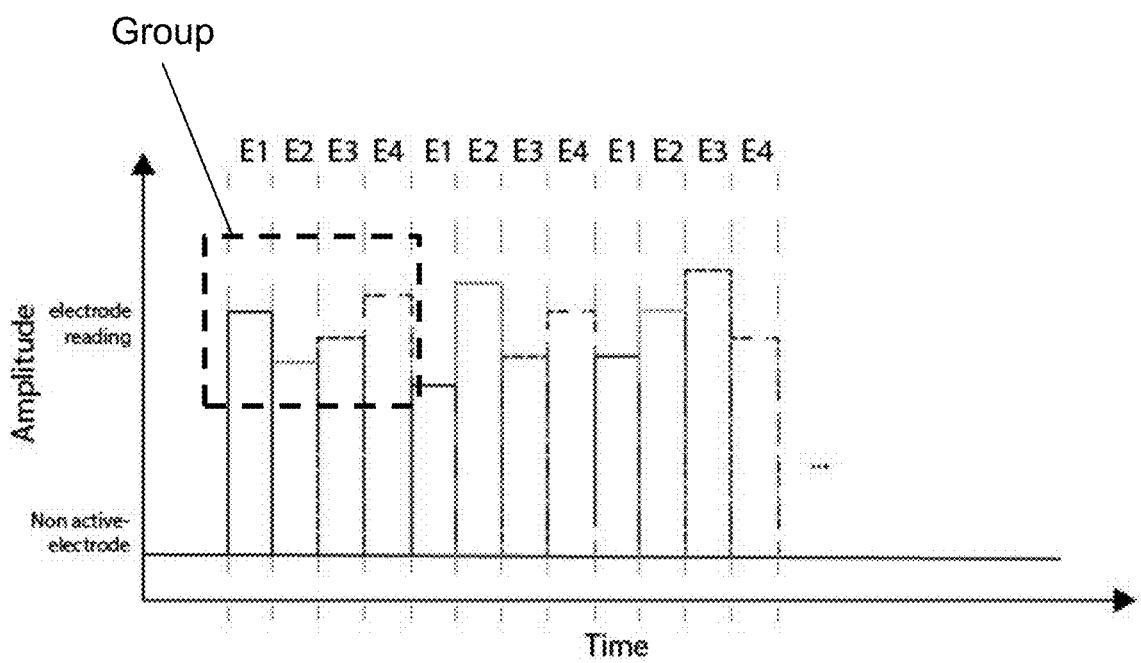
FIG. 15B shows corresponding exemplary output signals from a multi-point measurement of a conductive electrode.

FIG. 15B shows an example output signal received at the microcontroller 51 versus time, using the switching process described. The microcontroller 51 reads the output signal from each sensing point E1, E2, E3, E4 one by one. This scan process may be cycled continuously in a loop as shown. The output signal from each sensing point E1, E2, E3, E4 may be read for a certain pre-defined period time, before switching to the next sensing point E1, E2, E3, E4. The switching frequency may be sufficiently high such that the human perceives the output signal reading as continuous. For example, the switching frequency may be between 100 Hz and 200 Hz depending applications. This may be sufficiently high to provide real time results. A software program can be configured to read scanned signals as timed groups, see FIG. 15B, each 'Group' consists of a number (n) of signal readings (E1, E2, E3, E4, . . . EN). The number of signal readings (n) equals the total number of electrodes that exist in the system (or specific sensor device). The said software program is configured to calculate a plain location coordinate (X,Y) using each group of signal reading (E1, E2, E3, E4, . . . En) through algorithms, or machine learning methods.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A sensor device comprising:
   a plurality of electrode portions configured to provide one or more electrical signals, wherein there is a gap between respective electrode portions; and
   a non-conductive material provided on or over the plurality of electrode portions;
   wherein the one or more electrical signals are provided in response to measuring a change in capacitance between at least one of the plurality of electrode portions and at least one other of the plurality of electrode portions, responsive to a change in the gap therebetween caused by a force or pressure applied to the non-conductive material.

2. The device of claim 1, wherein the plurality of electrode portions form at least a part of one or more electrodes.

3. The device claim 1, wherein one or more of the plurality of electrode portions is formed of or comprises a thermo-formable conductive material; and wherein the non-conductive material is formed of or comprises a thermo-formable material.

4. The device of claim 3, wherein the thermo-formable conductive material is or comprises one or more of: silicone rubber comprising conductive material, conductive natural rubber, and a conductive plastics material; and
   wherein the non-conductive material is or comprises one or more of silicone rubber, natural rubber, a plastics material, and thermo-formed fabrics or synthetic leather.

5. The device claim 1, wherein at least one of the plurality of electrode portions and the non-conductive material has, at least in part, a three-dimensional form; and wherein the at least one of the plurality of electrode portions has, at least in part, a planar form.

6. The device of claim 1, wherein the plurality of electrode portions and the non-conductive material are formed, by molding, to comprise one or more user interactive areas.

7. The device of claim 1, wherein the non-conductive material is over molded on or over the plurality of electrode portions.

8. The device of claim 1, wherein the non-conductive material is further provided in the gap.

9. The device of claim 1, wherein the at least one of the plurality of electrode portions has, at least in part, a planar form.

10. The device of claim 1, wherein when a force or pressure is applied, movement of one or more of the electrode portions changes the gap.

11. The device of claim 1, further comprising a projection formed in the non-conductive material, the projection arranged for a user to grip or move; and
    wherein one or more of the plurality of electrode portions extends into the projection.

12. The device of claim 11, wherein movement of the projection causes relative movement between the one or more electrode portions and at least one other of the plurality of electrode portions and wherein the device is configured to detect push, pull and/or twist movements of the projection.

13. The device of claim 1, wherein the non-conductive material is formed of or comprises a substantially rigid material, or a flexible, deformable or pliable material or wherein the plurality of electrode portions is formed of or comprises a substantially rigid material, or a flexible, deformable or pliable material.

14. A system comprising a sensor device as defined in claim 1, and a measurement apparatus, the measurement apparatus configured, in use, to receive one or more electrical signals from the sensor device, the measurement apparatus comprising instructions to process the one or more electrical signals from the sensor device over a period of time and determine, from variations or characteristics in the one or more electrical signals, the pressure exerted on the device, and/or a direction of movement of at least one of the plurality of electrode portions relative to another of the plurality of electrode portions.

15. A method of manufacturing the sensing device as defined in claim 1, the method comprising an over molding process of:
    forming the plurality of electrode portions or the non-conductive material; and
    forming the other of the plurality of electrode portions or the non-conductive material over the plurality of electrode portions or the non-conductive material.

16. A sensor device comprising:
    a plurality of electrode portions configured to provide one or more electrical signals, wherein there is a gap between respective electrode portions; and
    a non-conductive material provided on or over the plurality of electrode portions;
    wherein the plurality of the electrode portions are formed of or comprises a thermo-formable conductive material; and wherein the non-conductive material is formed of or comprises a thermo-formable material;
    wherein the one or more electrical signals are provided in response to measuring a change in capacitance between at least one of the plurality of electrode portions and a conductive object being near to or in contact with the non-conductive material provided on or over the respective electrode portion;
    wherein the one or more electrical signals are proportional to the overlap area of the conductive object and at least one of the respective electrode portions; and
    wherein the plurality of electrode portions are configured to provide a change in the one or more electrical signals in response to movement of a conductive object across the non-conductive material provided on or over the plurality of electrode portions.

17. The device of claim 16, wherein the plurality of electrode portions form at least a part of one or more electrodes.

18. The device claim 16, wherein at least one of the plurality of electrode portions and the non-conductive material has, at least in part, a three-dimensional form; and wherein the at least one of the plurality of electrode portions has, at least in part, a planar form.

19. The device of claim 16, wherein the plurality of electrode portions and the non-conductive material are formed, by molding, to comprise one or more user interactive areas.

20. The device of claim 16, wherein the non-conductive material is over molded on or over the plurality of electrode portions.

21. The device of claim 16, wherein the non-conductive material is further provided in the gap.

22. The device of claim 16, wherein at least one of the plurality of electrode portions are shaped and arranged to provide the one or more electrical signals in response to linear or circular movements of a conductive object across the non-conductive material.

23. The device of claim 16, wherein at least two adjacent electrode portions are configured to overlap in one or more directions either in contact or not in contact with each other and wherein the at least two adjacent electrode portions are configured to interdigitate with each other.

24. The device of claim 16, wherein the plurality of electrode portions comprises one or more hollows or recesses to provide a predetermined resistance between any two given points, and wherein there is a plurality of hollows or recesses forming a regular array and wherein at least one of the plurality of electrode portions comprises a complex shape or a repeating geometric pattern to provide a predetermined resistance between any two given points.

25. The device of claim 16, wherein the plurality of electrode portions or the non-conductive material has, at least in part, a three-dimensionally profiled surface, and wherein the electrical signal changes in response to movement of the conductive object over the surface of the non-conductive material.

26. The device of claim 16, wherein the non-conductive material is formed of or comprises a substantially rigid material, or a flexible, deformable or pliable material or wherein the plurality of electrode portions is formed of or comprises a substantially rigid material, or a flexible, deformable or pliable material.

27. The device of claim 16, wherein the thermo-formable conductive material is or comprises one or more of: silicone rubber comprising conductive material, conductive natural rubber, and a conductive plastics material; and
    wherein the non-conductive material is or comprises one or more of silicone rubber, natural rubber, a plastics material, and thermo-formed fabrics or synthetic leather.

28. A method of manufacturing the sensing device as defined in claim 16, the method comprising an over molding process of:
    forming the plurality of electrode portions or the non-conductive material; and
    forming the other of the plurality of electrode portions or the non-conductive material over the plurality of electrode portions or the non-conductive material.

29. A system comprising a sensor device as defined in claim 16, and a measurement apparatus, the measurement apparatus configured, in use, to receive one or more electrical signals from the sensor device, the measurement apparatus comprising instructions to process the one or more electrical signals from the sensor device over a period of time and determine, from variations or characteristics in the one or more electrical signals, a location of a touch on the sensor device with a conductive object, a speed of movement of the conductive object across the device, and/or a direction of movement of the conductive object.

* * * * *